United States Patent
Mori

(10) Patent No.: US 12,488,812 B2
(45) Date of Patent: Dec. 2, 2025

(54) SEMICONDUCTOR MEMORY DEVICE AND METHOD FOR MANUFACTURING SEMICONDUCTOR MEMORY DEVICE

(71) Applicant: Kioxia Corporation, Tokyo (JP)

(72) Inventor: Yusuke Mori, Yokkaichi Mie (JP)

(73) Assignee: KIOXIA CORPORATION, Tokyo (JP)

( * ) Notice: Subject to any disclaimer, the term of this patent is extended or adjusted under 35 U.S.C. 154(b) by 412 days.

(21) Appl. No.: 17/897,710

(22) Filed: Aug. 29, 2022

(65) Prior Publication Data

US 2023/0298634 A1 Sep. 21, 2023

(30) Foreign Application Priority Data

Mar. 18, 2022 (JP) ................. 2022-043735

(51) Int. Cl.
*G11C 5/06* (2006.01)
*H10B 41/10* (2023.01)
*H10B 41/27* (2023.01)
*H10B 41/35* (2023.01)

(52) U.S. Cl.
CPC ............... *G11C 5/06* (2013.01); *H10B 41/10* (2023.02); *H10B 41/27* (2023.02); *H10B 41/35* (2023.02)

(58) Field of Classification Search
CPC ........................................... G11C 5/06
See application file for complete search history.

(56) References Cited

U.S. PATENT DOCUMENTS

2021/0057425 A1* 2/2021 Han ................. H10B 41/50
2021/0398998 A1 12/2021 Jung et al.
2022/0085036 A1 3/2022 Yoshimizu et al.

FOREIGN PATENT DOCUMENTS

JP 2021-034486 A 3/2021
TW 202211456 A 3/2022
TW I776492 B2 9/2022

* cited by examiner

*Primary Examiner* — Alfredo Bermudez Lozada
(74) *Attorney, Agent, or Firm* — Foley & Lardner LLP

(57) ABSTRACT

A semiconductor memory device includes a first wiring, a second wiring, a columnar insulating portion, and a first insulating layer. The first insulating layer includes a first edge. When it is assumed that a position closest to the columnar insulating portion on the first edge is a first position, a position of the first insulating layer, which is different from the first edge and is closest to the columnar insulating portion, is a second position, a virtual line along the first edge is a first virtual line, and a virtual line connecting the first position and the second position is a second virtual line, a crossing angle between the first virtual line and the second virtual line as seen from an inside of the first insulating layer is 90 degrees or more.

12 Claims, 32 Drawing Sheets

(a)

(b)

(a)

(b)

(a)

(b)

(a)

(b)

(a)

(b)

(a)

(b)

SEMICONDUCTOR MEMORY DEVICE AND METHOD FOR MANUFACTURING SEMICONDUCTOR MEMORY DEVICE

CROSS-REFERENCE TO RELATED APPLICATION

This application is based upon and claims the benefit of priority from Japanese Patent Application No. 2022-043735, filed Mar. 18, 2022, the entire contents of which are incorporated herein by reference.

FIELD

Embodiments described herein relate generally to a semiconductor memory device and a method for manufacturing the semiconductor memory device.

BACKGROUND

A semiconductor memory device including a stacked body of alternately stacked insulating layers and word lines, and a columnar body penetrating the stacked body is known.

DETAILED DESCRIPTION

Figure 1:
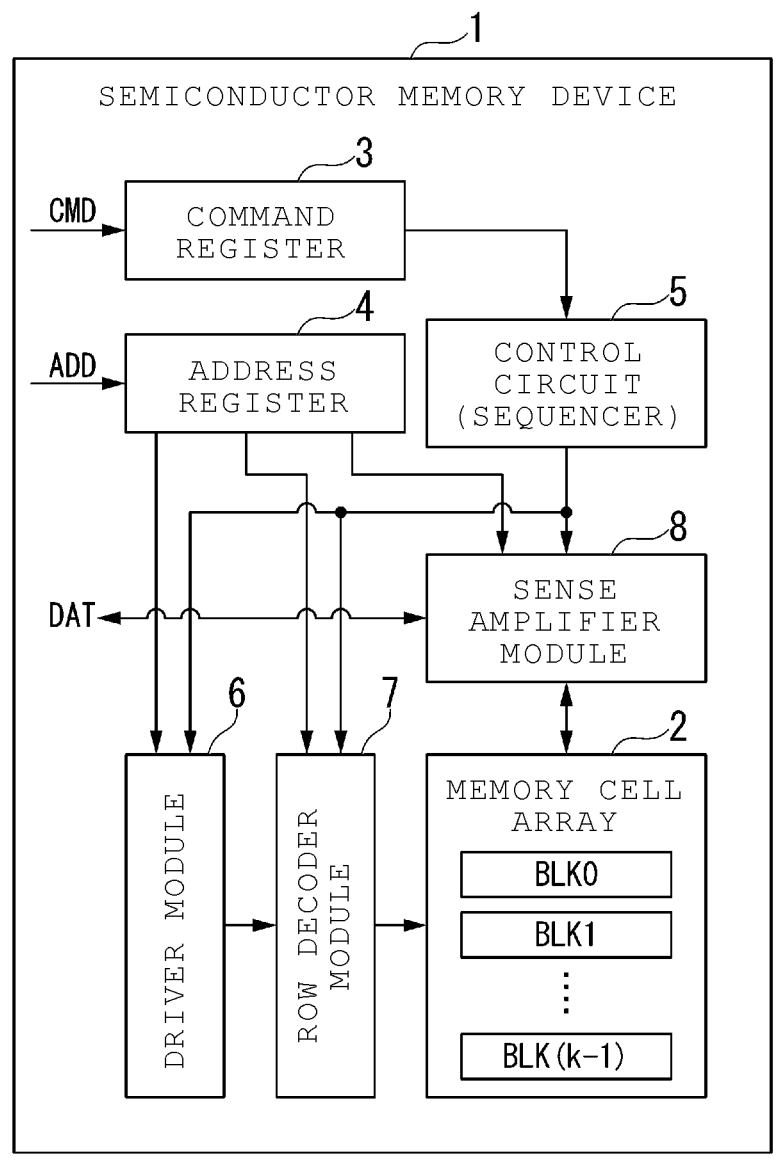
FIG. 1 is a block diagram illustrating a configuration of a semiconductor memory device according to a first embodiment.

Embodiments provide a semiconductor memory device suitable for high performance and a method for manufacturing the semiconductor memory device.

In general, according to one embodiment, a semiconductor memory device includes a first wiring extending in a first direction; a second wiring extending in the first direction and spaced from the first wiring in a second direction intersecting with the first direction; a columnar insulating portion positioned between the first wiring and the second wiring and extending in a third direction intersecting the first direction and the second direction; a first channel portion positioned between the first wiring and the columnar insulating portion and extending in the third direction; a first charge storage structure positioned between the first wiring and the first channel portion; a second channel portion positioned between the second wiring and the columnar insulating portion and extending in the third direction; a second charge storage structure positioned between the second wiring and the second channel portion; and a first insulating layer provided between the first wiring and the second wiring along with the columnar insulating portion in the first direction, and having at least a portion being provided between the first charge storage structure and the second charge storage structure. The first insulating layer includes a first edge positioned at an end of the first insulating layer in the second direction and extending in the first direction. In cross sections along the first direction and the second direction, when it is assumed that a position closest to the columnar insulating portion on the first edge is a first position, a position of the first insulating layer, which is different from the first edge and is closest to the columnar insulating portion, is a second position, a virtual line along the first edge is a first virtual line, and a virtual line connecting the first position and the second position is a second virtual line, a crossing angle between the first virtual line and the second virtual line as seen from an inside of the first insulating layer is 90 degrees or more.

Hereinafter, a semiconductor memory device of an embodiment and a method for manufacturing the semiconductor memory device will be described with reference to the drawings. In the following description, configurations having the same or similar functions are designated by the same reference numerals. Then, the duplicate description of those configurations may be omitted. In the following description, certain components may be denoted with the reference numerals followed by numbers or letters at the end for distinction purposes, in which case the numbers or the letters at the end may be omitted when it is not necessary to distinguish the components from each other.

In the present application, "parallel", "orthogonal", or "same" may encompass "substantially parallel", "substantially orthogonal", or "substantially the same", respectively. "Connection" is not limited to mechanical connections and may include electrical connections. That is, the "connection" is not limited to a plurality of elements being directly connected to each other, and may include a plurality of elements being connected to each other with another element interposed therebetween. "Adjacent" or "lined up" is not limited to a plurality of elements in contact with each other, and may encompass a plurality of elements that are separated away from each other (for example, when another element are interposed between the plurality of elements). An "insulating portion", "insulating layer", or "insulating film" broadly refers to a portion provided for electrical insulation, and is not limited to those formed only of an insulating material. The "insulating portion", "insulating layer", or "insulating film" may include a portion formed of a material other than the insulating material (e.g., a semiconductor material).

First, +X direction, −X direction, +Y direction, −Y direction, +Z direction, and −Z direction are defined. The +X direction, the −X direction, the +Y direction, and the −Y direction are directions along a surface of a silicon substrate 10 described below. The +X direction is the direction in which a bit line BL to be described below extends. The −X direction is the direction opposite to the +X direction. When the +X direction and the −X direction are not distinguished, they are simply referred to as "X direction". The +Y direction and the −Y direction are directions that intersect with (for example, orthogonal to) the X direction. The +Y direction is the direction in which the word line WL to be described below extends. The −Y direction is the direction opposite to the +Y direction. When the +Y direction and the −Y direction are not distinguished, they are simply referred to as Y direction". The +Z direction and the −Z direction are directions that intersect (for example, orthogonal to) the X direction and the Y direction, and are the thickness directions of the silicon substrate 10. The +Z direction is the direction from the silicon substrate 10 toward a stacked body 30 to be described below. The −Z direction is the direction opposite to the +Z direction. When the +Z direction and the −Z direction are not distinguished, they are simply referred to as "Z direction". The "+Z direction" herein may be referred to as "upward" and the "−Z direction" may be referred to as "downward", in some cases. However, these expressions are for convenience only and do not specify the direction of gravity.

First Embodiment

<1. Configuration of Semiconductor Memory Device>

First, the configuration of a semiconductor memory device 1 of a first embodiment will be described. In the drawings described below, the illustration of the insulating portion not related to the description may be omitted. In some drawings, the hatching illustrating the cross section may be partially omitted for a clear view.

FIG. 1 is a block diagram illustrating a configuration of the semiconductor memory device 1. The semiconductor memory device 1 is a nonvolatile semiconductor memory device and is a NAND flash memory, for example. The semiconductor memory device 1 can be connected to an external host device, and is used as a storage space for the host device, for example. The semiconductor memory device 1 includes a memory cell array 2, a command register 3, an address register 4, a control circuit (sequencer) 5, a driver module 6, a row decoder module 7, and a sense amplifier module 8, for example.

The memory cell array 2 includes a plurality of blocks BLK0 to BLK(k−1) (k is an integer of 1 or more). The block BLK is a set of a plurality of memory cell transistors that store data in a nonvolatile manner. The block BLK is used as a data erasing unit. The memory cell array 2 includes a plurality of bit lines and a plurality of word lines.

The command register 3 stores a command CMD received by the semiconductor memory device 1 from the host device. The address register 4 stores address information ADD received by the semiconductor memory device 1 from the host device. The control circuit 5 controls various operations (for example, data write operation, read operation, and erasing operation) of the semiconductor memory device 1 based on the command CMD stored in the command register 3, for example.

The driver module 6 includes a voltage generation circuit and generates a voltage for use in various operations of the semiconductor memory device 1. The row decoder module 7 transfers the voltage applied to a signal line corresponding to the selected word line to the selected word line in the selected block BLK.

In the write operation, the sense amplifier module 8 applies a desired voltage to each bit line according to write data DAT received by the semiconductor memory device 1 from the host device. In the read operation, the sense amplifier module 8 determines the data value stored in each memory cell transistor based on the voltage of the bit line, and transfers the determination result to the host device as read data DAT.

<2. Configuration of Memory Cell Array>
<2.1 Electrical Configuration of Memory Cell Array>

Next, an electrical configuration of the memory cell array 2 will be described.

Figure 2:
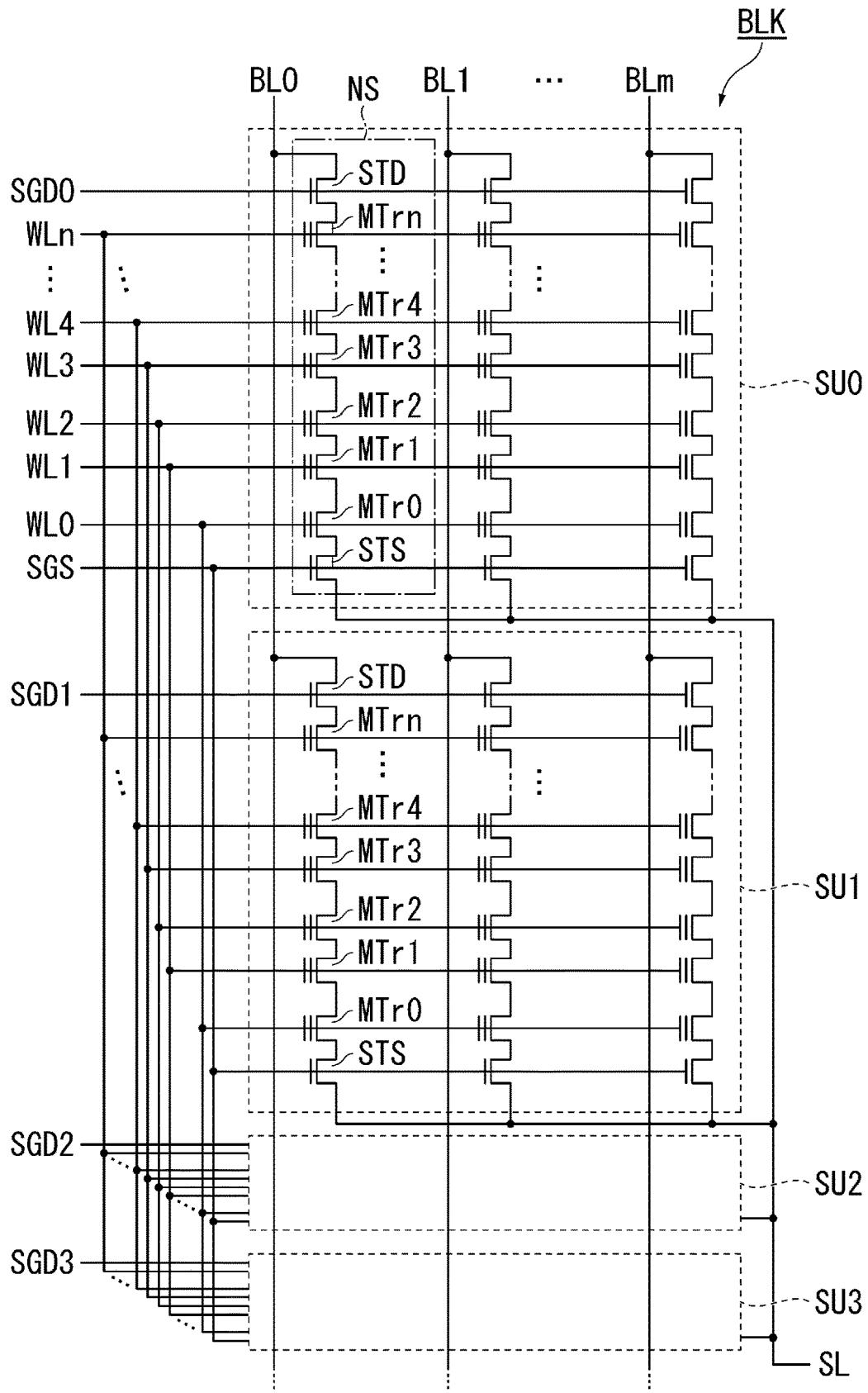
FIG. 2 is a diagram illustrating an equivalent circuit of a part of a memory cell array of the first embodiment.

FIG. 2 is a diagram illustrating a partial equivalent circuit of the memory cell array 2. FIG. 2 illustrates one block BLK in the memory cell array 2. The block BLK includes a plurality of (e.g., four) string units SU0 to SU3.

Each string unit SU includes a plurality of NAND strings NS associated with bit lines BL0 to BLm (m is an integer of 1 or more). For example, each NAND string NS includes a plurality of memory cell transistors MTr0 to MTrn (n is an integer of 1 or more), one or more drain-side select transistors STD, and one or more source-side select transistors STS.

In each NAND string NS, the memory cell transistors MTr0 to MTrn are connected in series. Each memory cell transistor MTr includes a control gate and a charge storage unit. The control gate of the memory cell transistor MTr is connected to any of word lines WL0 to WLn. Each memory cell transistor MTr stores charges in the charge storage unit according to the voltage applied to the control gate via the word line WL, and stores the data in a nonvolatile manner.

The drain of the drain-side select transistor STD is connected to the bit line BL corresponding to the NAND string NS. The source of the drain-side select transistor STD is connected to one end of the memory cell transistors MTr0 to MTrn connected in series. The control gate of the drain-side select transistor STD is connected to any one of drain-side select gate lines SGD0 to SGD3. The drain-side select transistor STD connects the NAND string NS and the bit line BL when a predetermined voltage is applied to the corresponding drain-side select gate line SGD.

The drain of the source-side select transistor STS is connected to the other end of the memory cell transistors MTr0 to MTrn connected in series. The source of the source-side select transistor STS is connected to the source line SL. The control gate of the source-side select transistor STS is connected to the source-side select gate line SGS. The source-side select transistor STS connects the NAND string NS and the source line SL when a predetermined voltage is applied to the source-side select gate line SGS.

In the same block BLK, the control gates of the memory cell transistors MTr0 to MTrn are commonly connected to the corresponding word lines WL0 to WLn, respectively. The control gates of the drain-side select transistors STD in the string units SU0 to SU3 are commonly connected to the corresponding select gate lines SGD0 to SGD3, respectively. The control gate of the source-side select transistor STS is commonly connected to the select gate line SGS. In the memory cell array 2, the bit lines BL are shared by the NAND strings NS that are assigned with the same column address in each string unit SU.

<2.2 Physical Configuration of Memory Cell Array>

Next, a physical configuration of the memory cell array 2 will be described.

Figure 3:
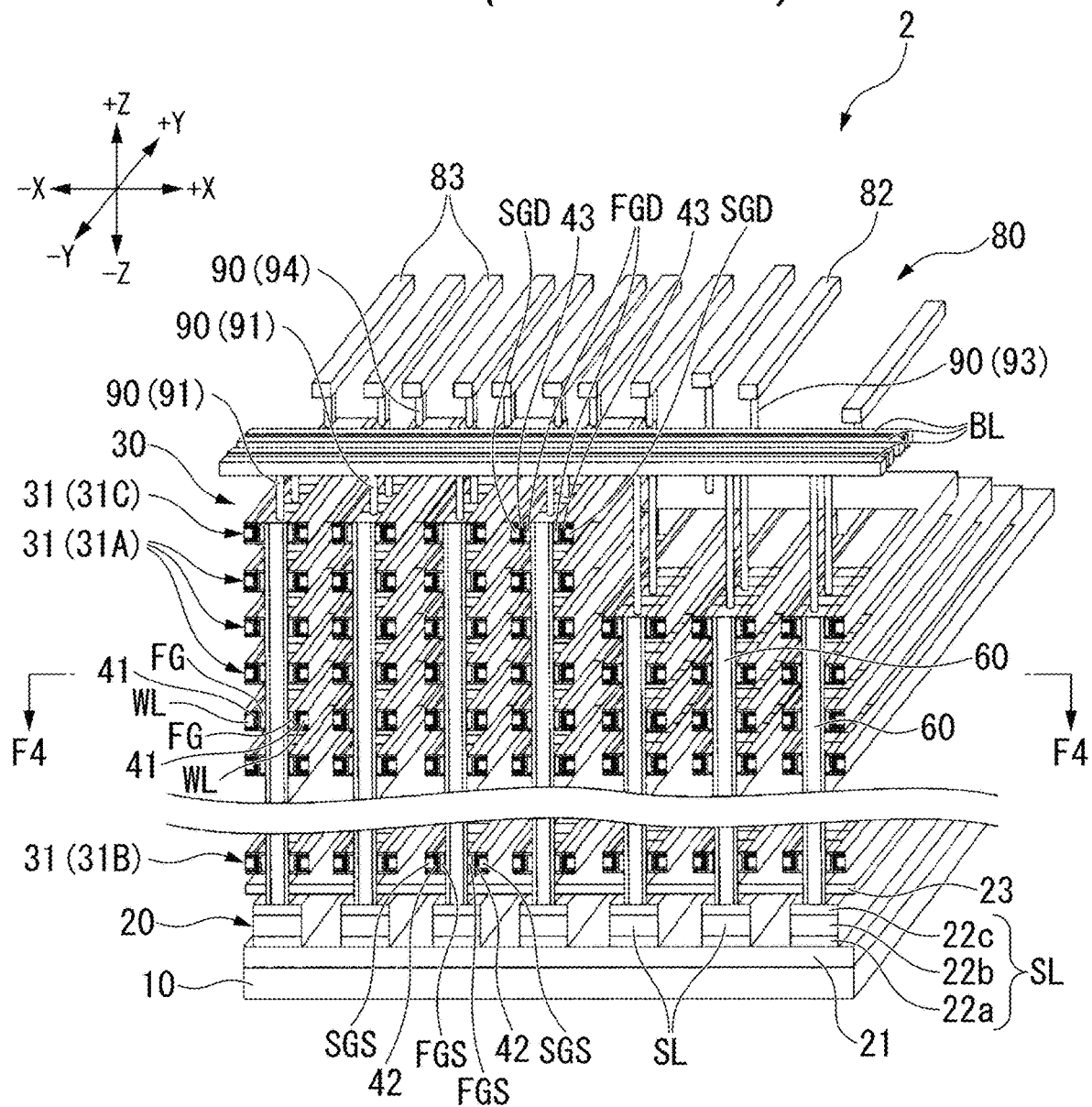
FIG. 3 is a perspective view illustrating a configuration of a part of the memory cell array of the first embodiment.

FIG. 3 is a perspective view illustrating a partial configuration of the memory cell array 2. For example, the memory cell array 2 includes the silicon substrate 10, a lower structure 20, the stacked body 30, a plurality of pillars 60, a first insulating layer 70 (see FIG. 4), an upper structure 80, and a plurality of contacts 90. The pillar 60 is an example of the "columnar body". In FIG. 3, the pillar 60 is schematically illustrated in a square columnar shape. In the description of the configuration, the Y direction is an example of the "first direction", the X direction is an example of the "second direction", and the Z direction is an example of the "third direction".

The silicon substrate 10 is a substrate that is the base of the semiconductor memory device 1. At least a part of the silicon substrate 10 is formed in a plate shape along the X direction and the Y direction. For example, the silicon substrate 10 is formed of a semiconductor material including silicon (Si). The silicon substrate 10 is an example of the "substrate".

The lower structure 20 is provided on the silicon substrate 10. For example, the lower structure 20 includes a lower insulating film 21, a plurality of source lines SL, and an upper insulating film 23. The lower insulating film 21 is provided on the silicon substrate 10. The plurality of source lines SL are provided on the lower insulating film 21. The plurality of source lines SL are adjacent to each other in the X direction and also extend in the Y direction, respectively. For example, the source line SL includes a conductive layer 22a provided on the lower insulating film 21, an interconnection layer 22b provided on the conductive layer 22a, and a conductive layer 22c provided on the interconnection layer 22b. The upper insulating film 23 is provided above the plurality of source lines SL. An insulating member (not illustrated) is provided between the source line SL and the upper insulating film 23, and between the lower insulating film 21 and the upper insulating film 23.

The stacked body 30 is provided on the lower structure 20. For example, the stacked body 30 includes a plurality of functional layers 31 and a plurality of insulating films 32 (see FIG. 5). The insulating film 32 is an example of an "interlayer insulating film". The plurality of functional layers 31 and the plurality of insulating films 32 are alternately stacked one by one in the Z direction. The plurality of functional layers 31 include a plurality of first functional layers 31A, one or more second functional layers 31B, and one or more third functional layers 31C.

For example, each of the plurality of first functional layers 31A includes a plurality of word lines WL, a plurality of floating gate electrodes FG, and a plurality of block insulating films 41. The plurality of word lines WL are wiring provided on a side of the pillar 60. The plurality of word lines WL in one first functional layer 31A are adjacent to each other in the X direction and also extend in the Y direction, respectively. A voltage is applied to the word line WL by a drive circuit (not illustrated) when electrons are injected into the floating gate electrode FG to be described below, or when the electrons injected into the floating gate electrode FG are removed from the floating gate electrode FG, and the like, and a predetermined voltage is applied to the floating gate electrode FG connected to the corresponding word line WL.

Each of the plurality of floating gate electrodes FG is an electrode film provided on the side of the pillar 60. The floating gate electrode FG is a film capable of accumulating charges. The floating gate electrode FG changes the state of electron accumulation when the voltage is applied to the word line WL. Each floating gate electrode FG is provided between the word line WL corresponding to the floating gate electrode FG and the pillar 60 corresponding to the floating gate electrode FG. Hereinafter, by "corresponding", it means that elements are combined with each other into one memory cell transistor MTr, for example.

Each of the plurality of block insulating films 41 is provided between the word line WL corresponding to the block insulating film 41 and the floating gate electrode FG corresponding to the block insulating film 41. The configuration of the first functional layer 31A will be described in detail below.

The second functional layer 31B is provided under the plurality of first functional layers 31A. For example, the second functional layer 31B includes a plurality of source-side select gate line SGS, a plurality of source-side select gate electrodes FGS, and a plurality of block insulating films 42. The plurality of source-side select gate lines SGS are wiring provided on the side of the pillar 60. The plurality of source-side select gate lines SGS are adjacent to each other in the X direction and also extend in the Y direction, respectively. Each of the plurality of source-side select gate electrodes FGS is provided between the source-side select gate line SGS corresponding to the source-side select gate electrode FGS and the pillar 60 corresponding to the source-side select gate electrode FGS. Each of the plurality of block insulating films 42 is provided between the source-side select gate line SGS corresponding to the block insulating film 42 and the source-side select gate electrode FGS corresponding to the block insulating film 42. When the pillar 60 and the source line SL are electrically connected, a voltage is applied to the source-side select gate line SGS by a drive circuit (not illustrated), and a predetermined voltage is applied to the source-side select gate electrode FGS connected to the source-side select gate line SGS.

The third functional layer 31C is provided above the plurality of first functional layers 31A. For example, the third functional layer 31C includes a plurality of drain-side select gate lines SGD, a plurality of drain-side select gate electrodes FGD, and a plurality of block insulating films 43. The plurality of drain-side select gate lines SGD are wiring provided on the side of the pillar 60. The plurality of drain-side select gate lines SGD are adjacent to each other in the X direction and also extend in the Y direction, respectively. Each of the plurality of drain-side select gate electrodes FGD is provided between the drain-side select gate line SGD corresponding to the drain-side select gate electrode FGD and the pillar 60 corresponding to the drain-side select gate electrode FGD. Each of the plurality of block insulating films 43 is provided between the drain-side select gate line SGD corresponding to the block insulating film 43 and the drain-side select gate electrode FGD corresponding to the block insulating film 43. When the pillar 60 and the source line SL are electrically connected, a voltage is applied to the drain-side select gate line SGD by a drive circuit (not illustrated), and a predetermined voltage is applied to the drain-side select gate electrode FGD connected to the drain-side select gate line SGD.

The plurality of pillars 60 are provided on the plurality of source lines SL and extend in the Z direction, respectively. The plurality of pillars 60 are provided apart from each other in the X direction and the Y direction. For example, the plurality of pillars 60 are located in a matrix configuration along the X direction and the Y direction when viewed from the Z direction. The lower end of each pillar 60 penetrates the upper insulating film 23 of the lower structure 20 and is connected to the source line SL. Further, the configuration of the pillar 60 and the configuration of the first insulating layer 70 will be described in detail below.

The upper structure 80 is provided on the stacked body 30. For example, the upper structure 80 includes a plurality of bit lines BL, a wiring 81 (not illustrated) for the source-side select gate line SGS, a wiring 82 for the word line WL, and a wiring 83 for the drain-side select gate line SGD.

The plurality of contacts 90 extend in the Z direction, respectively. For example, the plurality of contacts 90 include a plurality of contacts 91 for the pillar 60, a plurality of contacts 92 (not illustrated) for the source-side select gate line SGS, a plurality of contacts 93 for the word line WL, and a plurality of contacts 94 for the drain-side select gate line SGD.

The contacts 91 are provided on the pillar 60. The plurality of bit lines BL are adjacent to each other in the Y direction and extend in the X direction, respectively. When the pillar 60 provided on the most −X direction side among the plurality of pillars 60 located in the X direction is the first pillar, the odd-numbered pillars 60 are connected to the common bit line BL via the contacts 91. The even-numbered pillars 60 are connected to another common bit lines BL via the contacts 91. That is, among the plurality of pillars 60 located in the X direction, the pillars 60 adjacent to each other are not connected to the same bit line BL.

The plurality of contacts 92 (not illustrated) are provided on the end of the source-side select gate line SGS in the +Y direction. The wiring 81 (not illustrated) is provided on the contact 92 and extends in the Y direction. The wiring 81 is connected to the source-side select gate line SGS via the contacts 92.

The plurality of contacts 93 are provided on the end of the word line WL in the Y direction. The wiring 82 is provided on the contacts 93 and extends in the Y direction. The wiring 82 is connected to the word line WL via the contacts 93.

The plurality of contacts 94 are provided on the end of the drain-side select gate line SGD in the +Y direction. The wiring 83 is provided on the contacts 94 and extends in the Y direction. The wiring 83 is connected to the drain-side select gate line SGD via the contacts 94.

<3. Structure of Stacked Body>

Next, the structure of the stacked body 30 will be described in detail.

Figure 4:
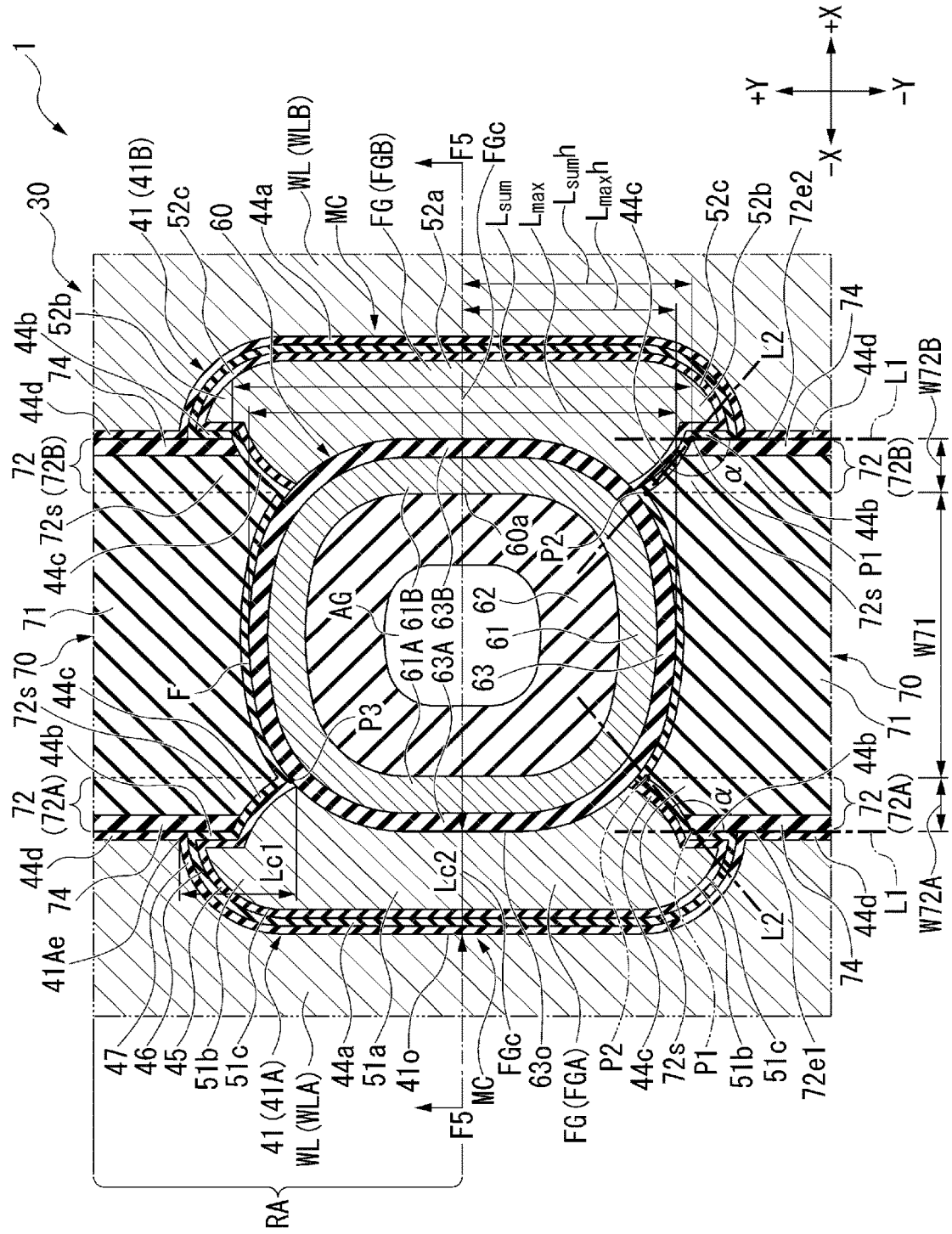
FIG. 4 is a cross-sectional view of a stacked body taken along line F4-F4 in FIG. 3.
Figure 5:
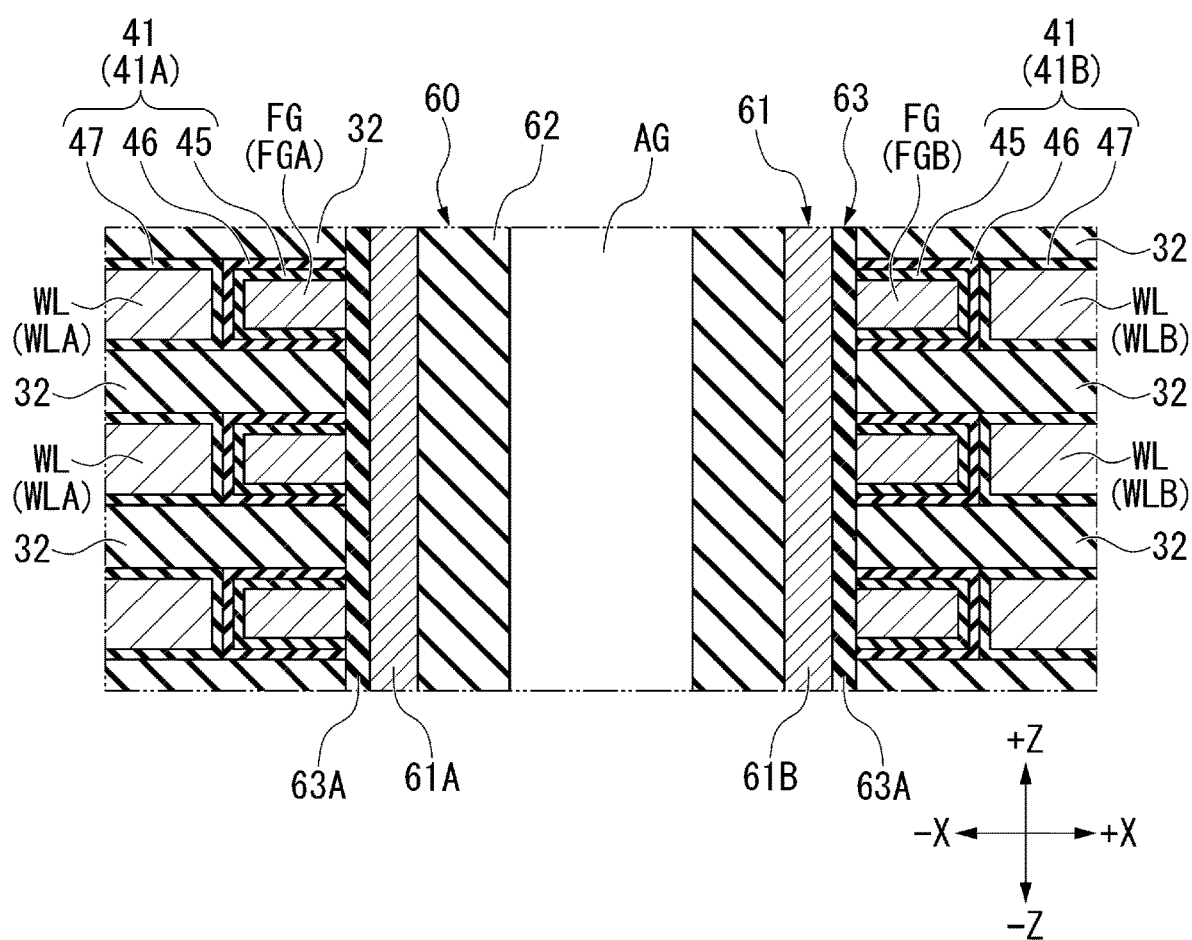
FIG. 5 is a cross-sectional view of the stacked body taken along line F5-F5 in FIG. 4.

FIG. 4 is a cross-sectional view of the stacked body 30 taken along the line F4-F4 in FIG. 3. FIG. 5 is a cross-sectional view of the stacked body 30 taken along the line F5-F5 in FIG. 4.

The stacked body 30 has a storage structure that can store information around each pillar 60. The storage structures individually provided around the plurality of pillars 60 have the same structure as each other. Therefore, one of the pillars 60 will be mainly described with reference to the structure around the one pillar 60.

<3.1 Word Line>

First, the word lines WL will be described. As illustrated in FIG. 4, a plurality of word line WLs include a first word line WLA positioned on the −X direction side and a second word line WLB positioned on the +X direction side for each pillar 60. The first word line WLA extends in the Y direction. The second word line WLB is separated away from the first word line WLA in the X direction and also extends in the Y direction. The first word line WLA and the second word line WLB are drawn out in opposite directions in the Y direction, for example, and are controlled independently of each other. The first word line WLA is an example of the "first wiring". The second word line WLB is an example of the "second wiring".

The word line WL is formed of tungsten, for example. A barrier metal film (not illustrated) for preventing the diffusion of the material of the word line WL may be provided on the surface of the word line WL. The barrier metal film is formed of titanium nitride (TiN), for example.

<3.2 Floating Gate Electrode>

Next, the floating gate electrode FG will be described. As illustrated in FIG. 4, a plurality of floating gate electrodes FG are provided on both sides in the X direction for each pillar 60. The plurality of floating gate electrodes FG include a first floating gate electrode FGA positioned on the −X direction side and a second floating gate electrode FGB positioned on the +X direction side for each pillar 60. The first floating gate electrode FGA is provided between the first word line WLA and the pillar 60 (more specifically, between the first word line WLA and a first channel portion 61A (to be described below) of the pillar 60). Meanwhile, the second floating gate electrode FGB is positioned between the second word line WLB and the pillar 60 (more specifically, between the second word line WLB and a second channel portion 61B (to be described below) of the pillar 60). The first floating gate electrode FGA is an example of a "first charge storage unit (or first charge storage structure)". The second floating gate electrode FGB is an example of a "second charge storage unit (or second charge storage structure)".

The floating gate electrode FG is formed of polysilicon, for example. The first floating gate electrode FGA changes the state of electron accumulation when a voltage is applied by the first word line WLA. The second floating gate electrode FGB changes the state of electron accumulation when a voltage is applied by the second word line WLB.

In the present embodiment, the first floating gate electrode FGA includes a first portion 51a and a second portion 51b, for example. The first portion 51a extends in the Y direction. The second portion 51b is provided on both sides of the first portion 51a in the Y direction. The second portion 51b is integrally formed with the first portion 51a. An outer edge 51c of the second portion 51b is formed in an arc shape so as to protrude away from the pillar 60 when viewed from the Z direction.

Likewise, the second floating gate electrode FGB includes a first portion 52a and a second portion 52b, for example. The first portion 52a extends in the Y direction. The second portion 52b is provided on both sides of the first portion 51a in the Y direction. The second portion 52b is integrally formed with the first portion 52a. An outer edge 52c of the second portion 52b is formed in an arc shape so as to protrude away from the pillar 60 when viewed from the Z direction.

<3.3 Block Insulating Film>

Next, the block insulating films 41 will be described. As illustrated in FIG. 4, a plurality of block insulating films 41 include a first block insulating film 41A positioned on the −X direction side and a second block insulating film 41B positioned on the +X direction side for each pillar 60. The first block insulating film 41A is positioned between the first word line WLA and the first floating gate electrode FGA. The second block insulating film 41B is positioned between the second word line WLB and the second floating gate electrode FGB. In the present embodiment, a part of the first block insulating film 41A is provided between the first floating gate electrode FGA and a second insulating portion 72A (to be described below) in the Y direction. A part of the second block insulating film 41B is provided between the second floating gate electrode FGB and a second insulating portion 72B (to be described below) in the Y direction. The first block insulating film 41A is an example of the "first insulating film".

The first block insulating film 41A and the second block insulating film 41B have the same configurations. Each of the first block insulating film 41A and the second block insulating film 41B includes a first portion 44a, a second portion 44b, and a third portion 44c, for example. The first portion 44a is positioned between the word line WL and the floating gate electrode FG and also extends in the Y direction. The second portion 44b is positioned on both sides of the first portion 44a in the Y direction and also extends in the direction approaching a core insulating portion 62 in the Y direction. Furthermore, each pair of second portions 44b positioned on both sides of the first portion 44a in the Y direction extend so as to approach each other in the Y direction. The third portion 44c extends from the end of the second portion 44b on the core insulating portion 62 side in the Y direction so as to be separated away from the second portion 44b in the Y direction. The third portion 44c is inclined away from the first portion 44a in the X direction as being farther away from the second portion 44b in the Y direction. Furthermore, the third portion 44c of the first block insulating film 41A is positioned between the first floating gate electrode FGA and the second insulating portion 72A, and also extends along an inclined portion 72s of the second insulating portion 72A described below. The third portion 44c of the second block insulating film 41B is positioned between the second floating gate electrode FGB and the second insulating portion 72B, and also extends along the inclined portion 72s of the second insulating portion 72B described below. Further, an insulating film 44d is provided at the ends of the first block insulating film 41A and the second block insulating film 41B in the Y direction. The insulating film 44d extends from the ends of the first block insulating film 41A and the second block insulating film 41B in the Y direction in the direction opposite to the second portion 44b in the Y direction.

From another viewpoint, each of the first block insulating film 41A and the second block insulating film 41B includes three insulating films 45, 46, and 47, for example.

The insulating film 45 is positioned closest to the floating gate electrode FG among the three insulating films 45, 46, and 47. For example, the insulating film 45 covers a side surface, an upper surface, and a lower surface of the floating gate electrode FG (see FIG. 5). The insulating film 45 forms a part of the first portion 44a, a part of the second portion 44b, and a part of the third portion 44c of the first block insulating film 41A or the second block insulating film 41B. The insulating film 45 is formed of a high-k material such as silicon nitride (SiN), hafnium oxide (HfO), and the like. However, the insulating film 45 may be formed of a material containing ruthenium (Ru), aluminum (Al), titanium (Ti), zirconium (Zr), or silicon (Si).

The insulating film 46 is provided on the side opposite to the floating gate electrode FG with respect to the insulating film 45. For example, the insulating film 46 covers the side surface, the upper surface, and the lower surface of the floating gate electrode FG with the insulating film 45 interposed therebetween (see FIG. 5). Instead of the configuration described above, the insulating film 46 may cover only the side surface of the floating gate electrode FG and also may be provided along a boundary between the insulating film (interlayer insulating film) 32 and the word line WL. The insulating film 46 forms a part of the first portion 44a, a part of the second portion 44b, and a part of the third portion 44c of the first block insulating film 41A or the second block insulating film 41B. In addition, the insulating film 46 is also provided at a position that covers the pillars 60 from both outer sides in the Y direction. The insulating film 46, or more specifically, the insulating film 46 that covers the pillar 60 from the outer side in the Y direction connects the insulating film 46 belonging to the first block insulating film 41A and the insulating film 46 belonging to the second block insulating film 41B in the X direction. The insulating film 46 is formed of silicon oxide, for example.

The insulating film 47 is provided on the side opposite to the floating gate electrode FG with respect to the insulating films 45 and 46. For example, the insulating film 47 is provided along a boundary between the insulating film (interlayer insulating film) 32 and the word line WL, and covers the side surface of the floating gate electrode FG with the insulating films 45 and 46 interposed therebetween (FIG. 3). Instead of the configuration described above, the insulating film 47 may cover the side surface, the upper surface, and the lower surface of the floating gate electrode FG like the insulating films 45 and 46. The insulating film 47 forms a part of the first portion 44a of the first block insulating film 41A or the second block insulating film 41B. Further, the insulating film 47 forms the insulating film 44d positioned on both outer sides of the first block insulating film 41A or second block insulating film 41B in the Y direction. The insulating film 47 may be formed of a material having a high dielectric constant, and is formed of a high-k film of an oxide film containing aluminum (Al), hafnium (Hf), and zirconium (Zr), for example. Further, the insulating film 47 may be formed of silicon nitride.

<3.4 Pillar>

Next, the pillar (columnar body) 60 will be described. The pillar 60 is provided between the first word line WLA and the second word line WLB. The pillar 60 includes the channel layer 61, the core insulating portion 62, and a tunnel insulating film 63, for example.

The channel layer 61 extends in the Z direction so as to extend over the entire length (total height) of the pillar 60 in the Z direction. The lower end of the channel layer 61 penetrates the upper insulating film 23 of the lower structure 20 and is connected to the source line SL. Meanwhile, the upper end of the channel layer 61 is connected to the bit line BL via the contact 91. The channel layer 61 is formed of a semiconductor material such as amorphous silicon (a-Si). However, the channel layer 61 may be formed of polysilicon partially doped with an impurity, for example. The impurity in the channel layer 61 is one selected from the group consisting of carbon, phosphorus, boron, and germanium. For example, in the channel layer 61, current flows between the source line SL and the bit line BL when electrons are injected into the floating gate electrode FG, when the electrons injected into the floating gate electrode FG are removed from the floating gate electrode FG, and the like.

In the present embodiment, the channel layer 61 is formed in an annular shape between the first word line WLA and the second word line WLB. The channel layer 61 includes the first channel portion 61A positioned on the −X direction side of the pillar 60 and the second channel portion 61B positioned on the +X direction side of the pillar 60. The first channel portion 61A is positioned between the first word line WLA and the core insulating portion 62 described below, and also extends in the Z direction. The second channel portion 61B is positioned between the second word line WLB and the core insulating portion 62 described below, and also extends in the Z direction. The first channel portion 61A and the second channel portion 61B are adjacent to each other in the X direction.

The core insulating portion 62 is positioned between the first and second word lines WLA and WLB. Furthermore, the core insulating portion 62 is provided closer to a center of the pillar 60 than the channel layer 61 in the X direction and the Y direction. For example, the core insulating portion 62 is provided on the inner peripheral surface of the channel layer 61. The core insulating portion 62 extends in the Z direction so as to extend over the entire length (total height) of the pillar 60 in the Z direction. The core insulating portion 62 is formed of silicon oxide, for example. The core insulating portion 62 is an example of a "columnar insulating portion". It is to be noted that, in the present application, by the term "columnar", it is not limited to a portion with a dense interior, and may include a portion with a hollow space therein. In the present embodiment, the core insulating portion 62 includes an air gap AG therein.

The tunnel insulating film 63 is formed in an annular shape surrounding the side surface in the −X direction, the side surface in the +X direction, the side surface in the −Y direction, and the side surface in the +Y direction of the channel layer 61. The tunnel insulating film 63 extends in the Z direction so as to extend over the entire length (total height) of the pillar 60 in the Z direction, for example. The tunnel insulating film 63 is an example of the second insulating film. The tunnel insulating film 63 includes a first tunnel insulating film 63A positioned on the −X direction side in the pillar 60 and a second tunnel insulating film 63B positioned on the +X direction side in the pillar 60. The first tunnel insulating film 63A is provided between the first floating gate electrode FGA and the first channel portion 61A. The second tunnel insulating film 63B is provided between the second floating gate electrode FGB and the second channel portion 61B.

As illustrated in FIG. 4, with the configuration described above, a cell structure MC capable of storing an electric charge is formed by the floating gate electrode FG, the block insulating film 41, and the tunnel insulating film 63 on the same side in the X direction with respect to one pillar 60. That is, one cell structure MC is formed by the first floating gate electrode FGA, the first block insulating film 41A, and the first tunnel insulating film 63A, and one cell structure MC is formed by the second floating gate electrode FGB, the second block insulating film 41B, and the second tunnel insulating film 63B. The block insulating film 41 in the cell structure MC includes the first portion 44a, the second portion 44b, and the third portion 44c, for example. The cell structure MC is formed around each pillar 60. Therefore, a plurality of cell structures MC are adjacent to each other in the Y direction.

<3.5 First Insulating Layer>

Next, the first insulating layer 70 will be described.

As illustrated in FIG. 4, the first insulating layer 70 is provided on the stacked body 30. The first insulating layer 70 is aligned with the core insulating portion 62 in the Y direction. The first insulating layer 70 is provided between the first word line WLA and the second word line WLB, and at least a part thereof is provided between the first floating gate electrode FGA and the second floating gate electrode FGB. As a result, the first insulating layer 70 isolates (electrically insulates) the first word line WLA and the second word line WLB in the X direction. The first insulating layer 70 extends at least in the Z direction. The first insulating layer 70 includes a first insulating portion 71 and two second insulating portions 72, for example. The two second insulating portions 72 are provided separately at both ends of the first insulating layer 70 in the X direction. The two second insulating portions 72 include the second insulating portion 72A positioned on the −X direction side with respect to the first insulating portion 71 and the second insulating portion 72B positioned on the +X direction side with respect to the first insulating portion 71.

The first insulating portion 71 is a portion of the first insulating layer 70 positioned away from a first edge 72e1 (to be described below) in the X direction. That is, the first insulating portion 71 is provided between the second insulating portion 72A and the second insulating portion 72B in the X direction. The second insulating portion 72A is an end of the first insulating layer 70 on the −X direction side, and is an example of a "first end". The second insulating portion 72B is an end of the first insulating layer 70 on the +X direction side, and is an example of the "first end".

<3.5.1 First Insulating Portion>

First, the first insulating portion 71 will be described. As illustrated in FIG. 4, the first insulating portion 71 is provided between the plurality of pillars 60 in the Y direction. The first insulating portion 71 is provided between the first word line WLA and the second word line WLB in the X direction, and isolates the first word line WLA and the second word line WLB. Further, a part of the first insulating portion 71 is provided between a part of the first floating gate electrode FGA and a part of the second floating gate electrode FGB in the X direction, and isolates the first floating gate electrode FGA and the second floating gate electrode FGB. Another part of the first insulating portion 71 is provided in a region outside the space between the first floating gate electrode FGA and the second floating gate electrode FGB in the X direction, and isolates the first word line WLA and the second word line WLB.

In the Y direction, the pillars 60 and the first insulating portion 71 are provided alternately. In other words, the first insulating portion 71 is provided separately on both sides of the pillar 60 in the Y direction. In the present embodiment, the first insulating portion 71 is adjacent to the pillar 60 in the Y direction via the insulating film 46 in the block insulating film 41. The first insulating portion 71 and the pillar 60 in cooperation with each other electrically insulate the first floating gate electrode FGA and the second floating gate electrode FGB. The first insulating portion 71 extends along the Z direction so as to extend over the entire length (total height) of the pillar 60 in the Z direction. The first insulating portion 71 is formed of an insulating material such as silicon oxide, for example. A width W71 of the first insulating portion 71 in the X direction is greater than a width W72A of the second insulating portion 72A in the X direction, and greater than a width W72B of the second insulating portion 72B in the X direction.

<3.5.2 Second Insulating Portion>

Next, the second insulating portion 72 will be described. As illustrated in FIG. 4, the second insulating portion 72 is provided on both sides in the X direction with respect to the first insulating portion 71. The second insulating portion 72A is provided between the first word line WLA and the first insulating portion 71 in the X direction. Furthermore, the second insulating portion 72A is provided between the first insulating portion 71 and the second portion 44b of the first block insulating film 41A in the X direction. Meanwhile, the second insulating portion 72B is provided between the second word line WLB and the first insulating portion 71. Furthermore, the second insulating portion 72B is provided between the first insulating portion 71 and the second portion 44b of the second block insulating film 41B in the X direction. The cell structure MC and the second insulating portion 72 are provided alternately in the Y direction.

As illustrated in FIG. 4, the second insulating portion 72A includes the first edge 72e1 and the inclined portion 72s. The first edge 72e1 is positioned at the end of the first insulating layer 70 in the X direction and extends in the Y direction. The first edge 72e1 is an edge of the first insulating layer 70 on the −X direction side. In the cross section along the Y direction and the X direction (that is, in the cross section illustrated in FIG. 4), when it is assumed that a position closest to the core insulating portion 62 on the first edge 72e1 is a first position P1, a position of the first insulating layer 70, which is different from the first edge 72e1 and closest to the core insulating portion 62, is a second position P2, a virtual line along the first edge 72e1 is a first virtual line L1, and a virtual line connecting the first position P1 and the second position P2 is a second virtual line L2, a crossing angle α between the first virtual line L1 and the second virtual line L2 as seen from the inside of the first insulating layer 70 is 90 degrees or more. In the present embodiment, the crossing angle α is greater than 90 degrees.

In other words, in the present embodiment, the second virtual line L2 is inclined with respect to the first virtual line L1 so as to approach the first insulating portion 71 as it approaches the core insulating portion 62 in the Y direction. In the present embodiment, the inclined portion 72s is inclined so as to approach the first insulating portion 71 as it approaches the core insulating portion 62 in the Y direction. The inclined portion 72s extends in the Y direction, and the dimension in the X direction gradually decreases as it approaches the core insulating portion 62 in the Y direction. For example, an inclined portion 72b is curved in a direction of approaching the first insulating portion 71 when viewed in the Z direction. The third portion 44c of the first block insulating film 41A extends along the inclined portion 72s. In the present embodiment, a part of the first floating gate electrode FGA is provided along the inclined portion 72s.

Further, the second insulating portion 72A is provided at a position adjacent to the floating gate electrode FGA and the third portion 44c of the block insulating film 41 in the Y direction, and extends on a straight line in the Y direction. That is, the second insulating portion 72A extends in parallel with the first insulating portion 71. The second insulating portion 72A is provided between the two cell structures MC positioned on both sides of the second insulating portion 72A in the Y direction. Further, the second insulating portion 72A is provided between the plurality of insulating films (interlayer insulating films) 32 in the Z direction.

In the present embodiment, the second insulating portion 72A includes a weakly resistant insulating film 74 having a weaker resistance to etching as compared with the first insulating portion 71. The weakly resistant insulating film 74 is provided at the end of the second insulating portion 72A in the −X direction (that is, the boundary portion between the second insulating portion 72A and the first word line WLA). Further, the second insulating portion 72A may include a plurality of weakly resistant insulating films 74. The weakly resistant insulating film 74 is a film having a weaker resistance to wet etching as compared with the first insulating portion 71, for example. In the present embodiment, the weakly resistant insulating film 74 is an insulating film formed of an insulating material such as silicon oxide, like the first insulating portion 71. The weakly resistant insulating film 74 is a film having a lower film formation temperature (for example, film formed at low temperature less than 350° C.), a lower crystallization rate, or a higher content of impurity other than silicon and oxygen as compared with the first insulating portion 71. The film formation temperature of the weakly resistant insulating film 74 is less than 300° C., for example, and less than 100° C., for example. The weakly resistant insulating film 74 is an example of the "insulating film".

The structure described above is the same in the second insulating portion 72A positioned on the −Y direction side with respect to the pillar 60 and the second insulating portion 72A positioned on the +Y direction side with respect to the pillar 60 when viewed in the Y direction. Further, when viewed in the X direction, the second insulating portion 72B has the same configuration as the second insulating portion 72A. In describing the second insulating portion 72B, with reference to the above description of the second insulating portion 72A, the "first edge 72e1" may be read as "second edge 72e2", the "−X direction" may be read as "+X direction", the "first block insulating film 41A" may be read as "second block insulating film 41B", and the "first floating gate electrode FGA" may be read as "second floating gate electrode FGB".

<3.5.3 Dimensional Relationship>

As illustrated in FIG. 4, the first floating gate electrode FGA includes a central portion FGc provided at a position that bisects the dimensions of the first floating gate electrode FGA in the Y direction. In the region RA positioned on one side in the Y direction (for example, the +Y direction side) with respect to the central portion FGc of the first floating gate electrode FGA, a dimension in the Y direction between an end 41Ae of the first block insulating film 41A in the Y direction and a position P3 farthest from the end 41Ae in the Y direction at an interface F between the first block insulating film 41A and the first tunnel insulating film 63A is defined as a first dimension Lc1. A dimension in the X direction between an outer peripheral surface 410 of the block insulating film 41 and an outer peripheral surface 63o of the tunnel insulating film at a position aligned with the central portion FGc of the first floating gate electrode FGA in the X direction is defined as a second dimension Lc2. In this case, the ratio of the first dimension Lc1 to the second dimension Lc2 is 60% or more. For example, the ratio of the first dimension Lc1 to the second dimension Lc2 is 80% or more. In the present embodiment, the ratio of the first dimension Lc1 to the second dimension Lc2 is 90% or more. Further, the ratio of the first dimension Lc1 to the second dimension Lc2 may be 100% or more. The end 41Ae is an example of the "first end".

As illustrated in FIG. 4, the pillar 60 has a portion 60a aligned with the inclined portion 72s of the second insulating portion 72. Then, the total dimension Lsum, including the dimension in the Y direction of the inclined portion 72s of the second insulating portion 72 positioned on the −Y direction side with respect to the pillar 60, the dimension in the Y direction of the inclined portion 72s of the second insulating portion 72 positioned on the +Y direction side with respect to the pillar 60, and the dimension in the Y direction of the portion 60a of the pillar 60, is equal to or greater than a maximum dimension Lmax in the Y direction of the pillar 60. In other words, the total dimension Lsumh, including the dimension in the Y direction of the inclined portion 72s of the second insulating portion 72 and half the dimension in the Y direction of the portion 60a of the pillar 60, is equal to or greater than a dimension Lmaxh which is half of the maximum dimension in the Y direction of the pillar 60.

<4. Manufacturing Method>

Next, a method for manufacturing the semiconductor memory device 1 will be described. The processes other than those described below are described, for example, in the description of US Patent Application Publication No. 2016/0336336, in the description of Japanese Patent Application No. 2019-043121, and the like. These literatures are incorporated by reference in their entirety herein.

FIGS. 6A to 6H are cross-sectional views illustrating a part of the manufacturing process of the semiconductor memory device 1 according to the first embodiment. The section (a) in each drawing is a cross-sectional view of the section (b) taken along the line a-a in each drawing. The section (b) in each drawing is a cross-sectional view of the section (a) taken along the line b-b in each drawing. In the description of the manufacturing method, the Z direction is an example of the "first direction" and the Y direction is an example of the "second direction".

Figure 6A:
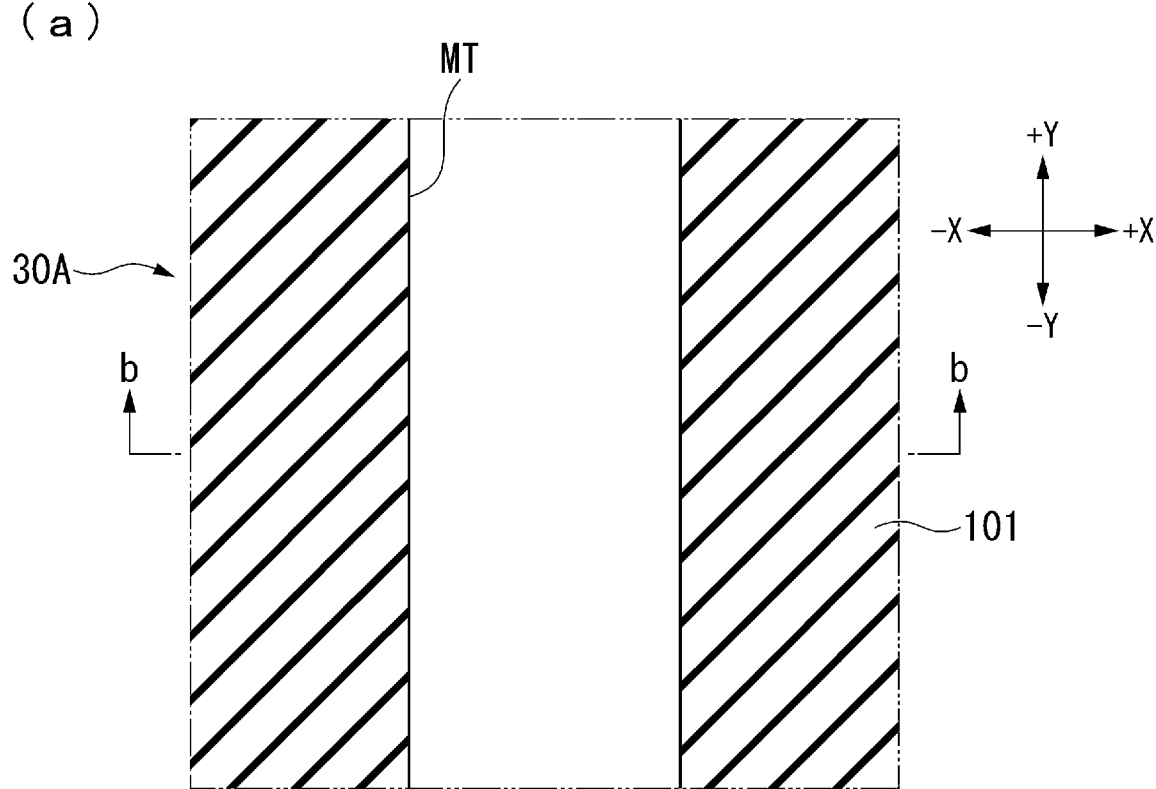
FIG. 6A is a cross-sectional view illustrating a part of a manufacturing process of the semiconductor memory device according to the first embodiment.
Figure 6A:
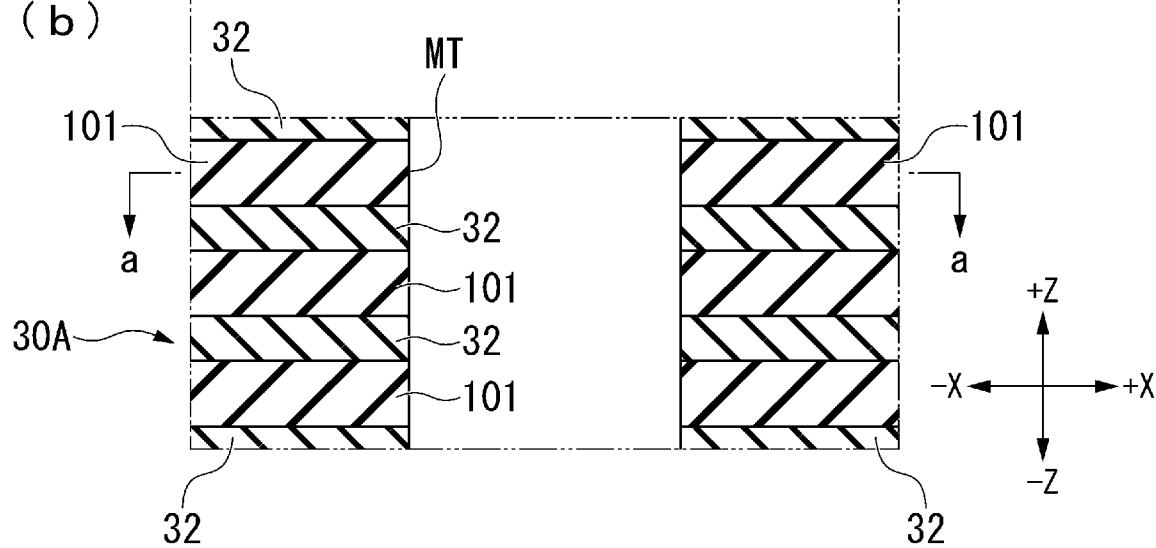

First, as illustrated in FIG. 6A, an intermediate stacked body 30A is formed by alternately stacking a plurality of sacrifice layers 101 and the plurality of insulating films (interlayer insulating films) 32 one by one in the Z direction. The sacrifice layer 101 is a layer that is replaced with the functional layer 31 in a later process. The sacrifice layer 101 is formed of silicon nitride (SiN), for example. Next, a mask (not illustrated) is provided above the intermediate stacked body 30A, and a memory trench MT is formed by etching, for example. The memory trench MT is a recess (groove) that penetrates the plurality of sacrifice layers 101 and the plurality of insulating films 32 in the Z direction. The memory trench MT extends in the intermediate stacked body 30A in the Y direction and the Z direction.

Figure 6B:
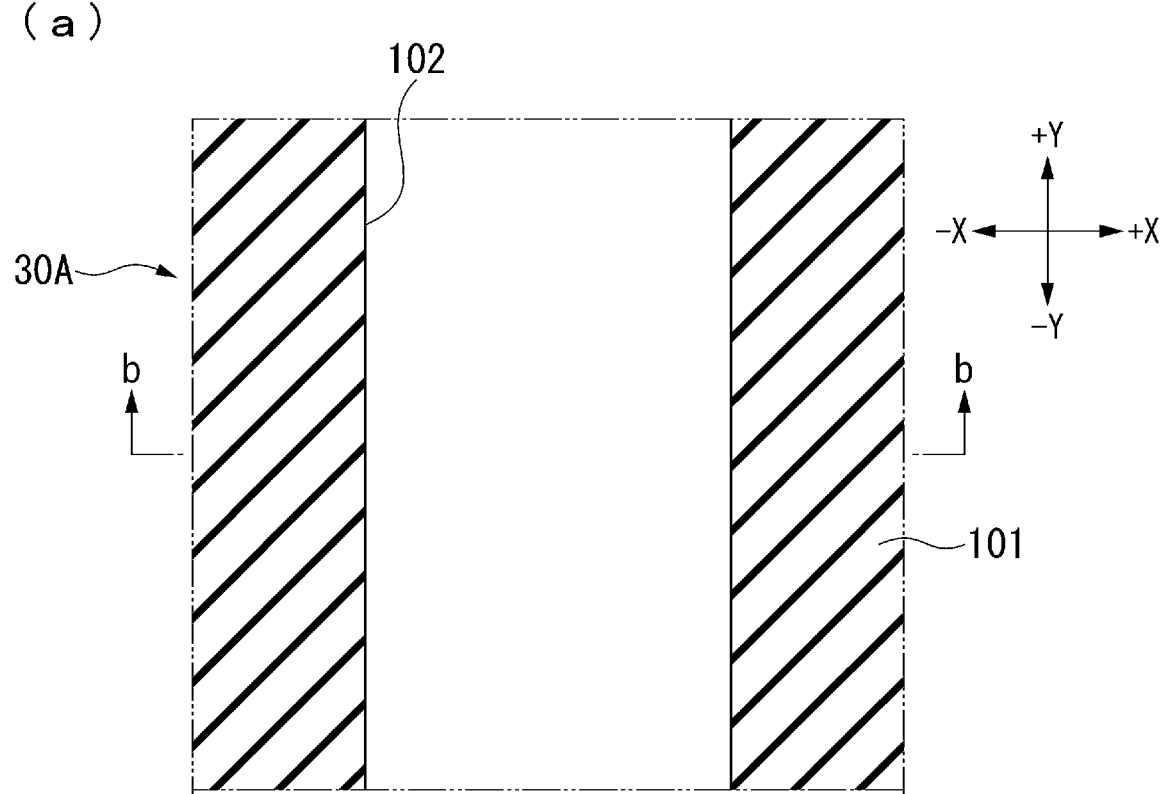
FIG. 6B is a cross-sectional view illustrating a part of the manufacturing process of the semiconductor memory device according to the first embodiment.
Figure 6B:
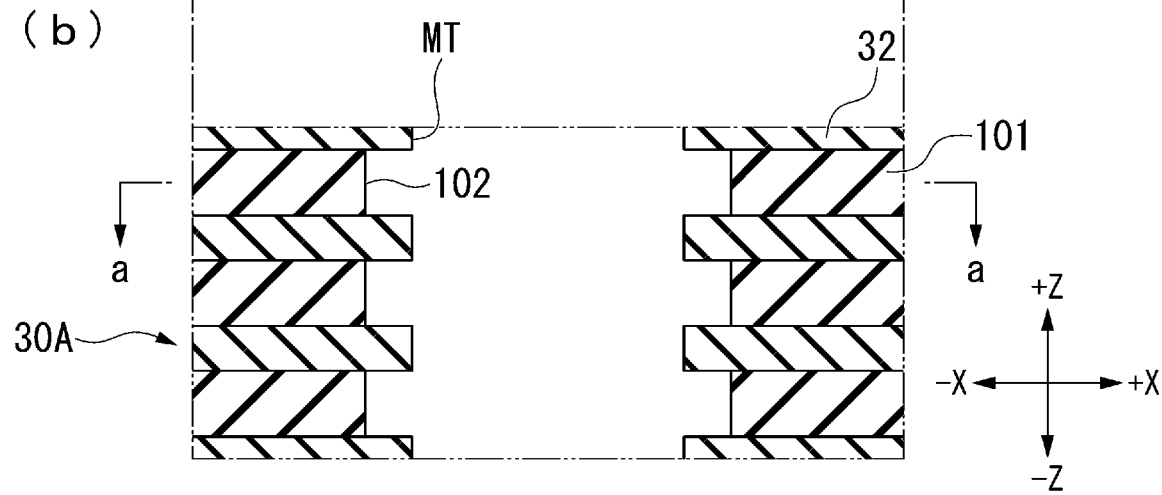

Next, as illustrated in FIG. 6B, wet etching is performed via the memory trench MT using hot phosphoric acid ($H_3PO_4$), which is a chemical solution that dissolves silicon nitride (SiN) as an etchant, for example. As a result, a part of the sacrifice layer 101 exposed to the memory trench MT is removed, and a recess 102 is formed on the side surface of the memory trench MT.

Figure 6C:
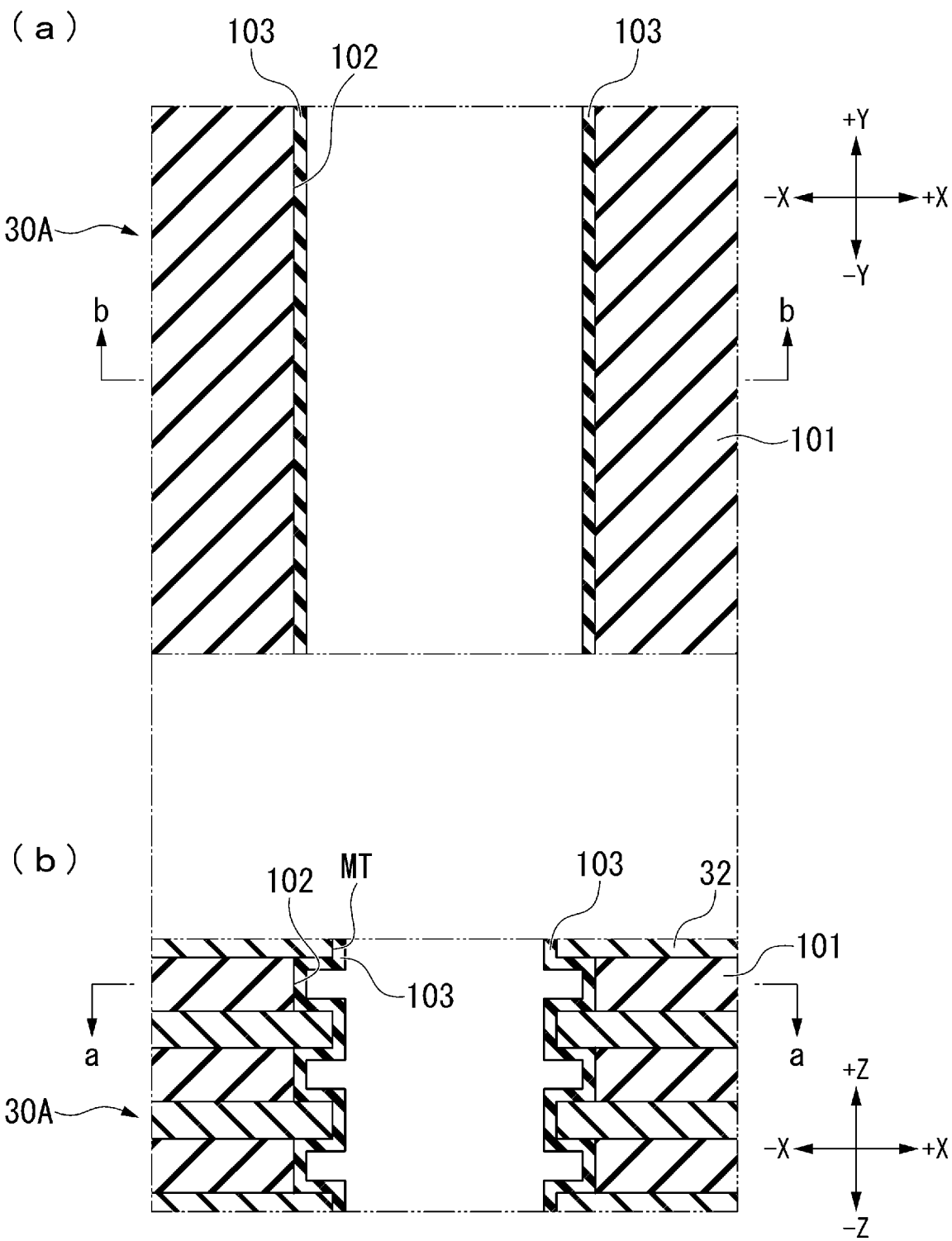
FIG. 6C is a cross-sectional view illustrating a part of the manufacturing process of the semiconductor memory device according to the first embodiment.

Next, as illustrated in FIG. 6C, by low temperature Atomic Layer Deposition (ALD), Low Temperature Oxide (LTO) film formation, a combination thereof, or the like, for example, a first intermediate film 103 made of silicon oxide is formed on the inner surface of the memory trench MT. The first intermediate film 103 is a film having a lower film formation temperature (e.g., low temperature film formation below 350° C.), a lower crystallization rate, or a higher content of impurity other than silicon and oxygen as compared with a second intermediate film 104 to be described below.

Figure 6D:
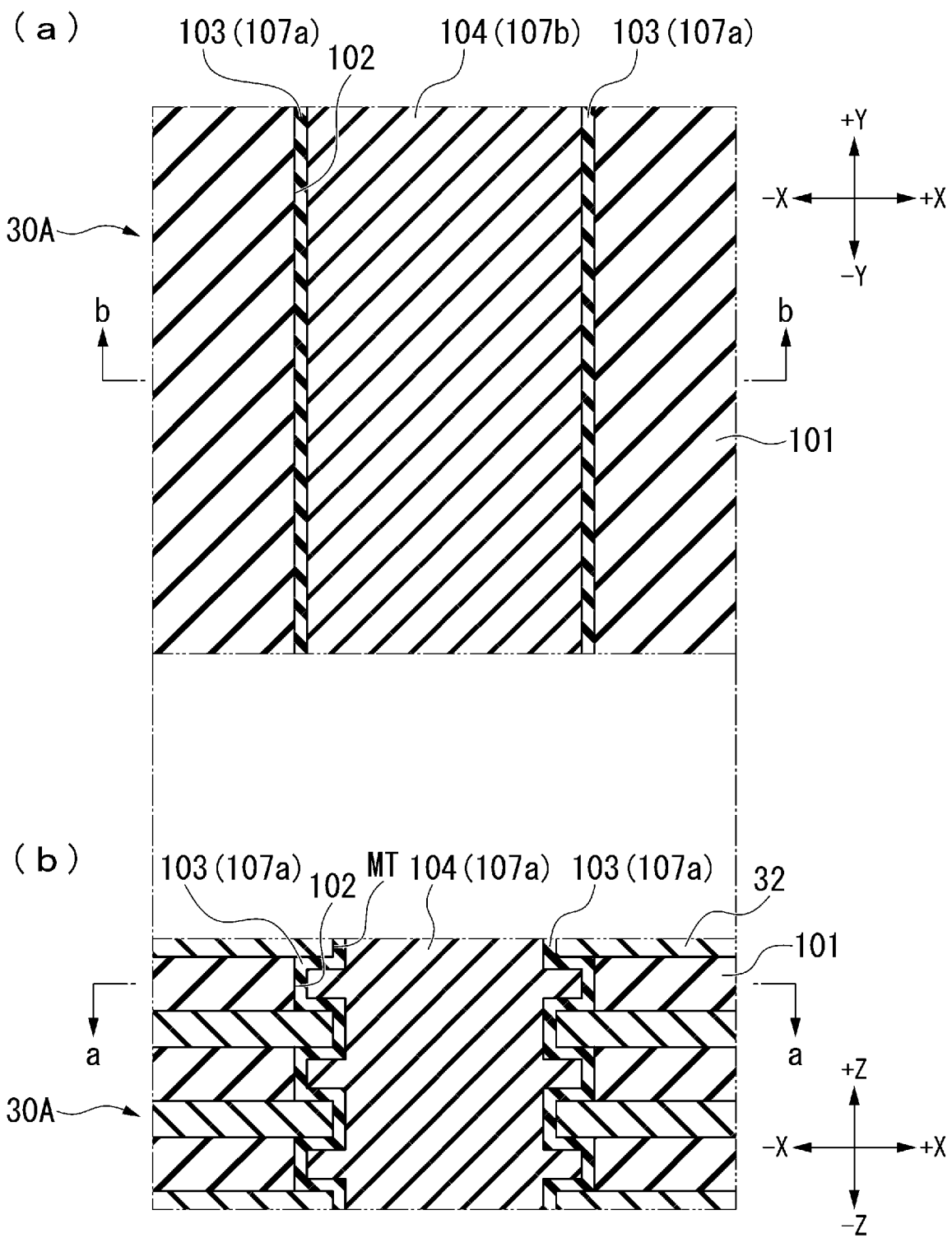
FIG. 6D is a cross-sectional view illustrating a part of the manufacturing process of the semiconductor memory device according to the first embodiment.

Next, as illustrated in FIG. 6D, for example, by LTO film formation, the second intermediate film 104 formed of silicon oxide is filled in the memory trench MT. The second intermediate film 104 is formed at a film formation temperature of 350° C. or higher, for example. In the present embodiment, the film formation temperature of the second intermediate film 104 is 350° C.

The first intermediate film 103 and the second intermediate film 104 are changed into an intermediate insulating layer 107 (see FIG. 6E) by the Rapid Thermal Annealing (RTA) or the like, for example. The intermediate insulating layer 107 is an example of the "insulating layer". The intermediate insulating layer 107 includes a first intermediate insulating layer 107a and a second intermediate insulating layer 107b. The first intermediate film 103 is formed into the first intermediate insulating layer 107a by the RTA and the like described above. The second intermediate film 104 is formed into the second intermediate insulating layer 107b by the RTA and the like described above.

Figure 6E:
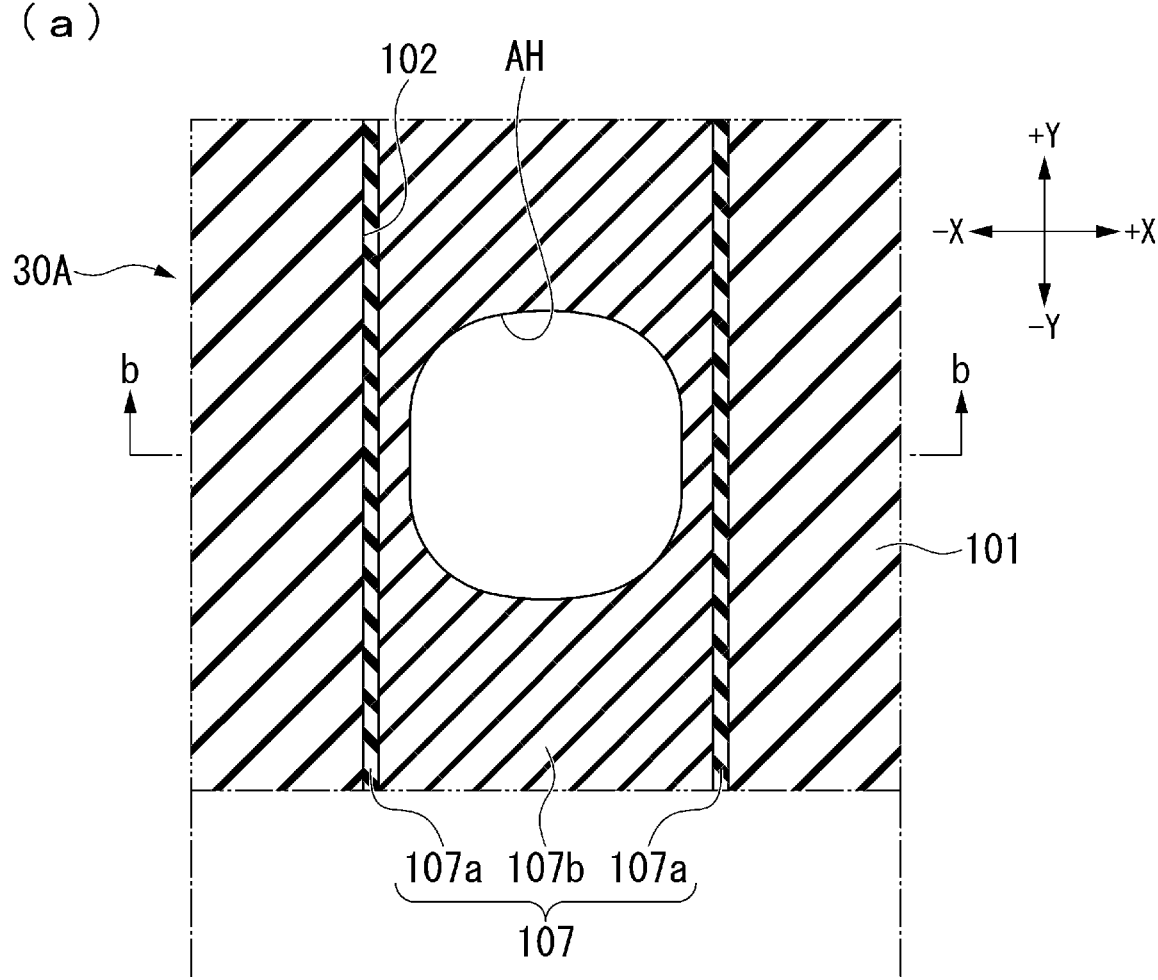
FIG. 6E is a cross-sectional view illustrating a part of the manufacturing process of the semiconductor memory device according to the first embodiment.
Figure 6E:
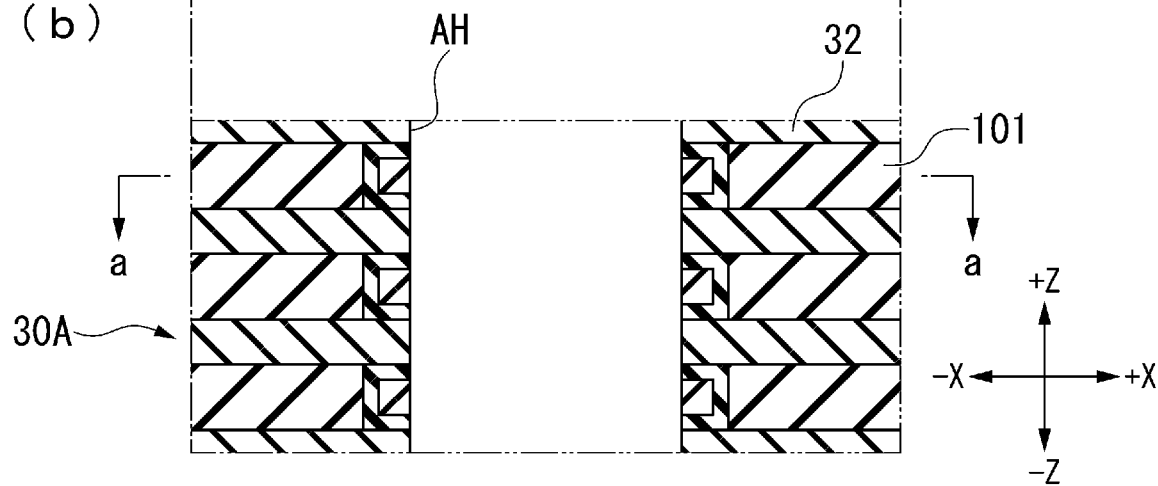

Next, as illustrated in FIG. 6E, a mask (not illustrated) corresponding to the pillar 60 is provided above the intermediate stacked body 30A, and a memory hole AH is formed by etching, for example. The memory hole AH is a hole that penetrates the intermediate insulating layer 107 in the Z direction. For example, the memory hole AH penetrates the first intermediate insulating layer 107a in the Z direction. The memory hole AH extends through the intermediate stacked body 30A in the Z direction. The memory hole AH is an example of a "hole".

Figure 6F:
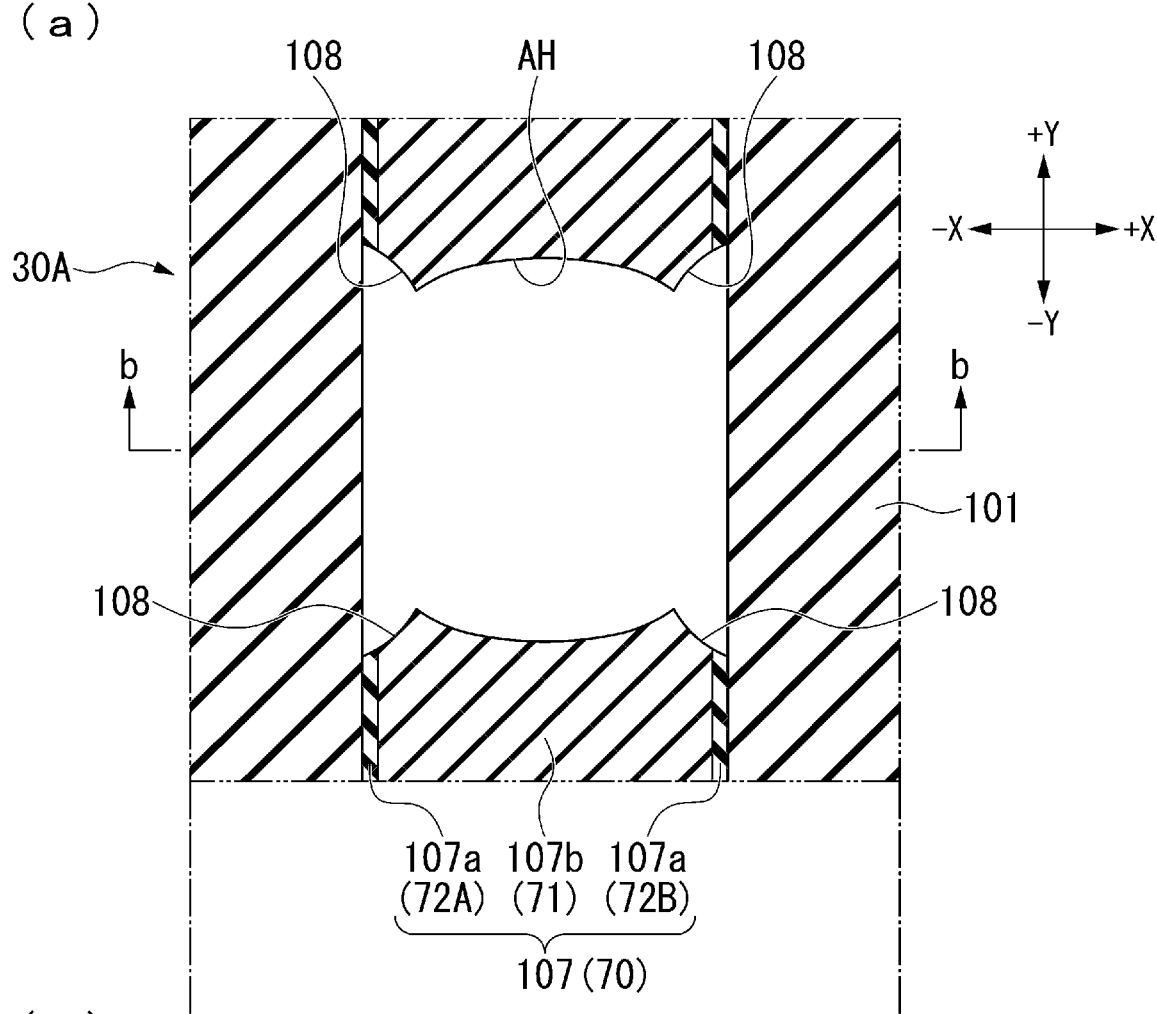
FIG. 6F is a cross-sectional view illustrating a part of the manufacturing process of the semiconductor memory device according to the first embodiment.
Figure 6F:
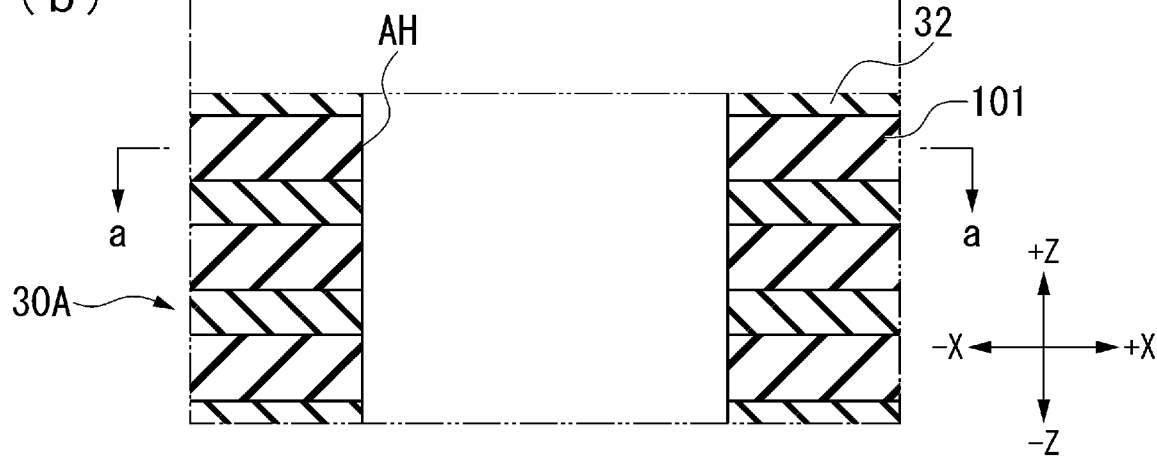

Next, as illustrated in FIG. 6F, a first etchant is supplied to the memory hole AH. As a result, the diameter of the memory hole AH is expanded, and also among the intermediate insulating layers 107 exposed to the memory hole AH, an end of the first intermediate insulating layer 107a having a weaker resistance to wet etching and a part of the second intermediate insulating layer 107b adjacent to the end are removed, and a first space portion 108 connected to the memory hole AH is formed. For example, the first space portion 108 is formed in a wedge shape in which the width in the X direction gradually decreases as being farther away from the memory hole AH. In the present embodiment, an etching solution that dissolves silicon oxide is used as the first etchant. The first space portion 108 is an example of the "space portion". As a result, the intermediate insulating layer 107 is formed into the first insulating layer 70 described above. That is, the second intermediate insulating layer 107b is formed into the first insulating portion 71, and the first intermediate insulating layer 107a is formed into the second insulating portion 72.

Figure 6G:
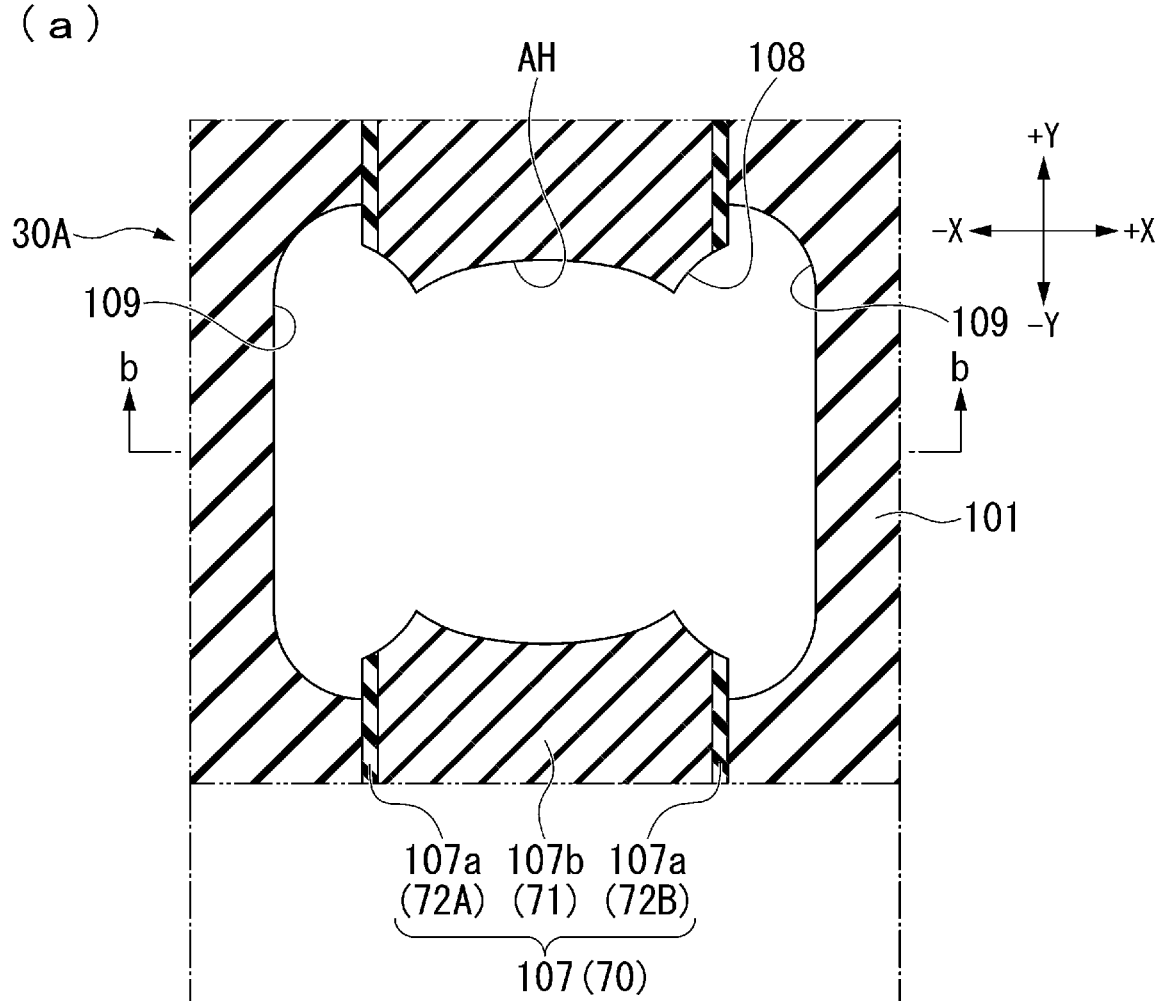
FIG. 6G is a cross-sectional view illustrating a part of the manufacturing process of the semiconductor memory device according to the first embodiment.
Figure 6G:
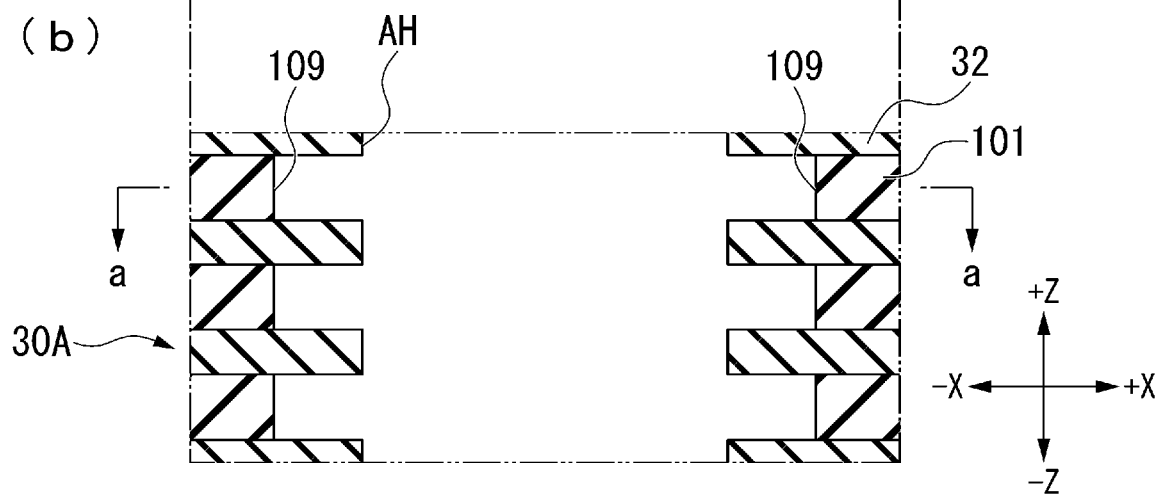

Next, as illustrated in FIG. 6G, the second etchant is supplied to the memory hole AH. As a result, a part of the plurality of sacrifice layers 101 exposed to the memory hole AH is removed. In the present embodiment, an etching solution that dissolves silicon nitride is used as the second etchant. In this example, since the first space portion 108 connected to the memory hole AH is provided, the etching by the second etchant is easily spread in the Y direction. As a result, a part of the sacrifice layer 101 is removed in the X direction and the Y direction, and a second space portion 109 connected to the first space portion 108 is formed.

Figure 6H:
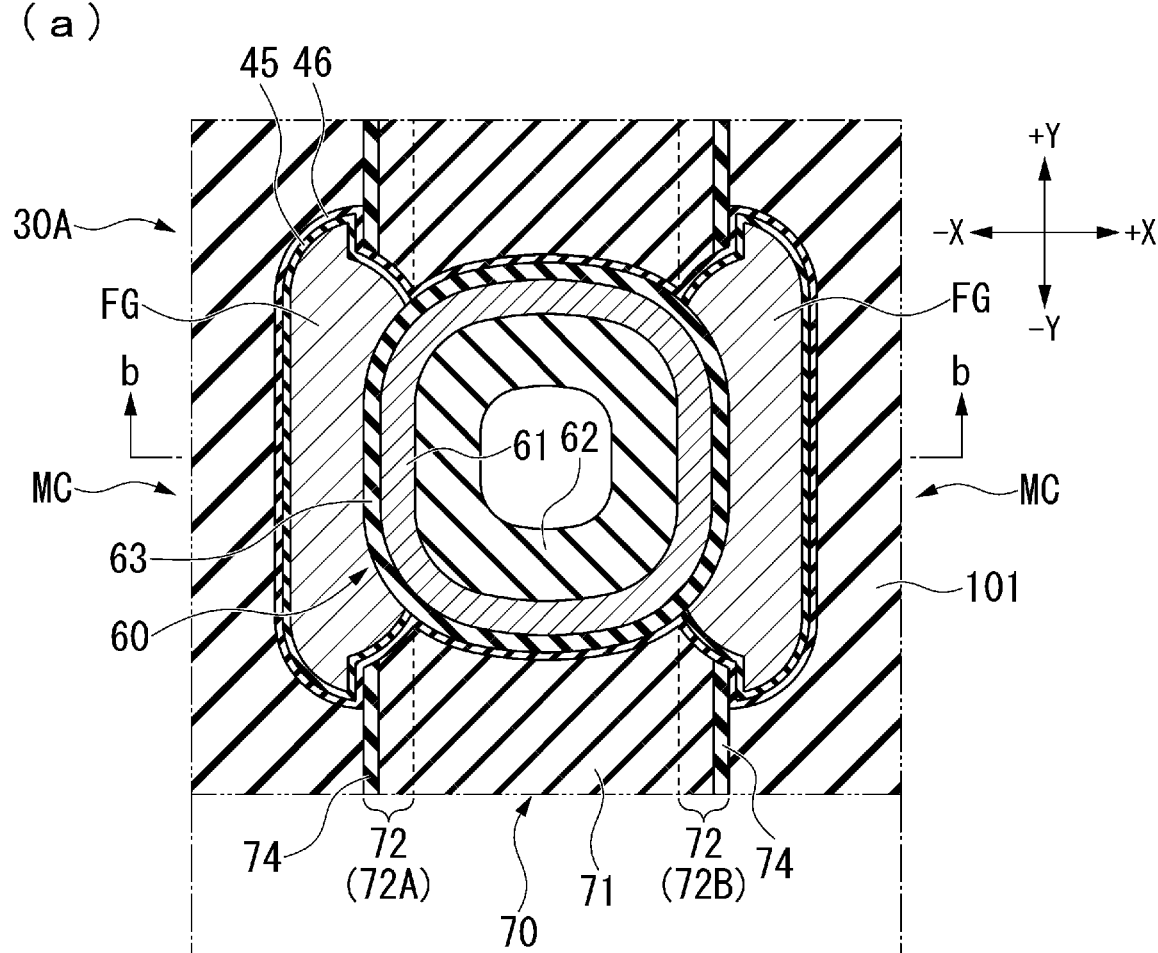
FIG. 6H is a cross-sectional view illustrating a part of the manufacturing process of the semiconductor memory device according to the first embodiment.
Figure 6H:
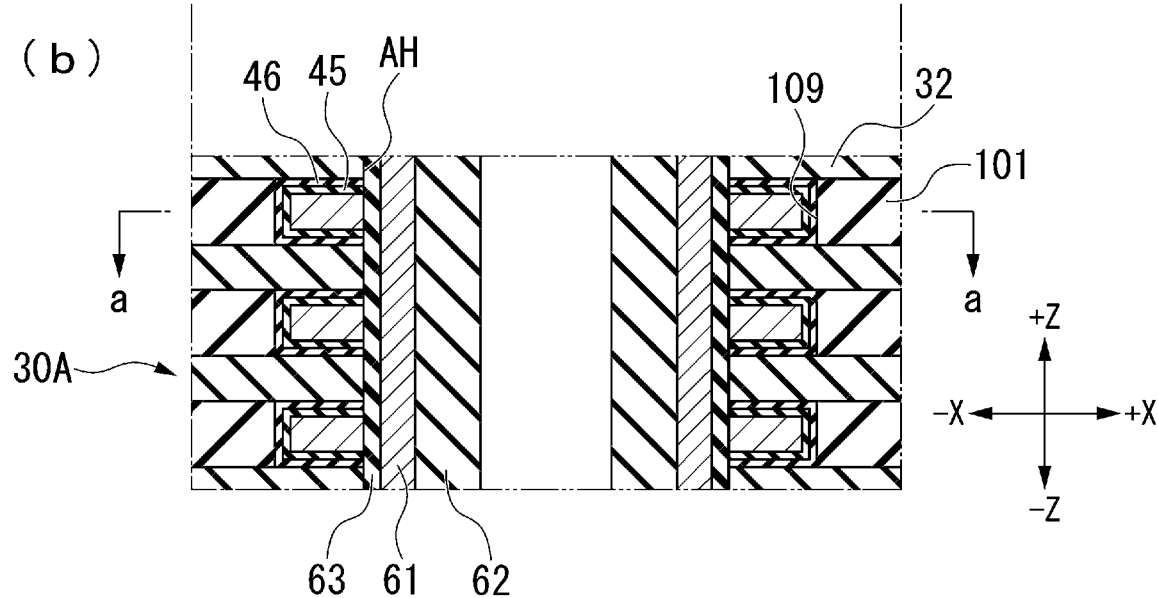

Next, as illustrated in FIG. 6H, the insulating films 45 and 46 of the block insulating film 41, the floating gate electrode FG, the tunnel insulating film 63, the channel layer 61, and the core insulating portion 62 are formed in the memory hole AH. As a result, most of the cell structure MC, and the pillar 60 are formed.

Next, wet etching is performed via another trench (not illustrated) provided in the intermediate stacked body 30A, and the plurality of sacrifice layers 101 are removed. Then, the insulating film 47 of the block insulating film 41 and the word line WL are sequentially formed in the space formed by removing the sacrifice layer 101. After that, the contacts 91 to 94, the wirings 81 to 83, and the like are formed. As a result, the memory cell array 2 is completed. Further, the semiconductor memory device 1 is completed by combining the memory cell array 2, the command register 3, the address register 4, the control circuit 5 (sequencer), the driver module 6, the row decoder module 7, and the sense amplifier module 8.

<5. Advantages>

As a comparative example, a structure not including a space portion such as the first space portion 108 in the manufacturing process is considered. That is, a configuration of supplying an etchant for removing the end of the sacrifice layer 101 from the columnar memory hole AH as illustrated in FIG. 6E is considered. In such a configuration, when a space for forming the floating gate electrode FG is formed, the etching in the Y direction is more difficult to proceed as compared with the etching in the X direction, and the dimension of the floating gate electrode FG in the X direction tends to be increased as compared with the dimension in the Y direction. In this case, it is difficult to achieve the enhancement of the degree of integration while securing a predetermined volume of the floating gate electrode FG. Further, when the dimension of the floating gate electrode FG in the X direction is increased as compared with the dimension in the Y direction, the end of the floating gate electrode FG in the Y direction tends to develop areas with a large curvature, resulting in a decreased fringe distance (the XY plane distance between the word line WL and the channel layer 61). As a result, it is difficult to improve the electrical characteristics of the cell structure MC, such as leakage current, and the like.

Therefore, in the present embodiment, the configuration described below was introduced into the first insulating layer 70, which is positioned between the first word line WLA and the second word line WLB, and in cooperation with the pillar 60, isolates the first word line WLA and the second word line WLB in the X direction. The first insulating layer 70 includes the first edge 72e1 positioned at the end of the first insulating layer 70 in the X direction and extending in the Y direction. In the cross section along the Y direction and the X direction, when it is assumed that a position closest to the core insulating portion 62 on the first edge 72e1 is the first position P1, a position of the first insulating layer 70, which is different from the first edge 72e1 and closest to the core insulating portion 62, is the second position P2, a virtual line along the first edge 72e1 is a first virtual line L1, and a virtual line connecting the first position P1 and the second position P2 is the second virtual line L2, a crossing angle α between the first virtual line L1 and the second virtual line L2 as seen from the inside of the first insulating layer 70 is 90 degrees or more.

According to such a configuration, as compared with the comparative example described above, etching in the Y direction more easily proceeds when the space for forming the floating gate electrode FG is formed, and the dimension of the floating gate electrode FG in the Y direction is hardly decreased as compared with the dimension in the X direction. As a result, the ratio of the first dimension Lc1 in the Y direction to the second dimension Lc2 of the cell structure MC in the X direction can be increased. That is, the aspect ratio (Lc1/Lc2) of the cell structure MC can be improved (increased). Therefore, the pitch in the X direction between the plurality of first insulating layers 70 can be reduced and the degree of integration can be enhanced. Further, by increasing the aspect ratio of the cell structure MC, the curvature of end of the floating gate electrode FG in the Y direction can be reduced. As a result, it possible to enhance the electrical characteristics of the cell structure MC. As a result, it possible to achieve the high performance of the semiconductor memory device 1.

In the present embodiment, the first insulating layer 70 includes a second insulating portion 72 including the first edge 72e1. Then, the second insulating portion 72 includes the inclined portion 72b inclined so as to approach the first insulating portion 71 as it approaches the core insulating portion 62 in the Y direction. According to such a configuration, etching in the Y direction more easily proceeds when the space for forming the floating gate electrode FG is formed, and it is possible to further achieve the enhancement of the degree of integration and the improvement of the electrical characteristics.

In the present embodiment, the total dimension Lsum, including the dimensions in the Y direction of the two inclined portions 72b positioned on both sides of the pillar 60 in the Y direction and the dimension in the Y direction of the portion 60a of the pillar 60 aligned with the inclined portions 72b in the Y direction, is equal to or greater than the maximum dimension Lmax of the pillar 60 in the Y direction. According to such a configuration, the dimension of the cell structure MC in the X direction is small, and it is possible to further achieve the enhancement of the degree of integration and the improvement of the electrical characteristics.

In the present embodiment, the second insulating portion 72 includes the weakly resistant insulating film 74 having a weaker resistance to wet etching as compared with the first insulating portion 71. According to such a configuration, when the first space portion 108 is formed, the etching solution can erode the second insulating portion 72 in preference to the first insulating portion 71. As a result, it is possible to easily form the first space portion 108.

In the present embodiment, the weakly resistant insulating film 74 is a film having a lower film formation temperature, a lower crystallization rate, or a higher content of impurity other than silicon and oxygen as compared with the first insulating portion 71. According to such a configuration, it is possible to easily form the weakly resistant insulating film 74 having a weaker resistance to wet etching.

In the present embodiment, the method for manufacturing a semiconductor memory device includes forming the intermediate stacked body 30A by alternately stacking the plurality of sacrifice layers 101 and the plurality of insulating films 32 one by one in the Z direction, and forming the intermediate insulating layer 107 in the memory trench MT which is a groove extending in the Z direction and the Y direction. After that, the memory hole AH extending in the Z direction is formed in the intermediate insulating layer 107. Subsequently, by supplying the first etchant to the memory hole, the first space portion 108 connected to the memory hole AH is formed, and by supplying the second etchant to the memory hole AH, a part of each of the plurality of sacrifice layers 101 exposed to the memory hole AH is removed. According to such a configuration, when the space for forming the floating gate electrode FG is formed, the etching in the Y direction easily proceeds via the first space portion 108. As a result, it is possible to further achieve the enhancement of the degree of integration and the improvement of the electrical characteristics.

Second Embodiment

Next, a second embodiment will be described. The second embodiment is different from the first embodiment in that the second insulating portion 72 includes a plurality of thin film insulating films 274. The configuration other than that described below is the same as that of the first embodiment.

Figure 7:
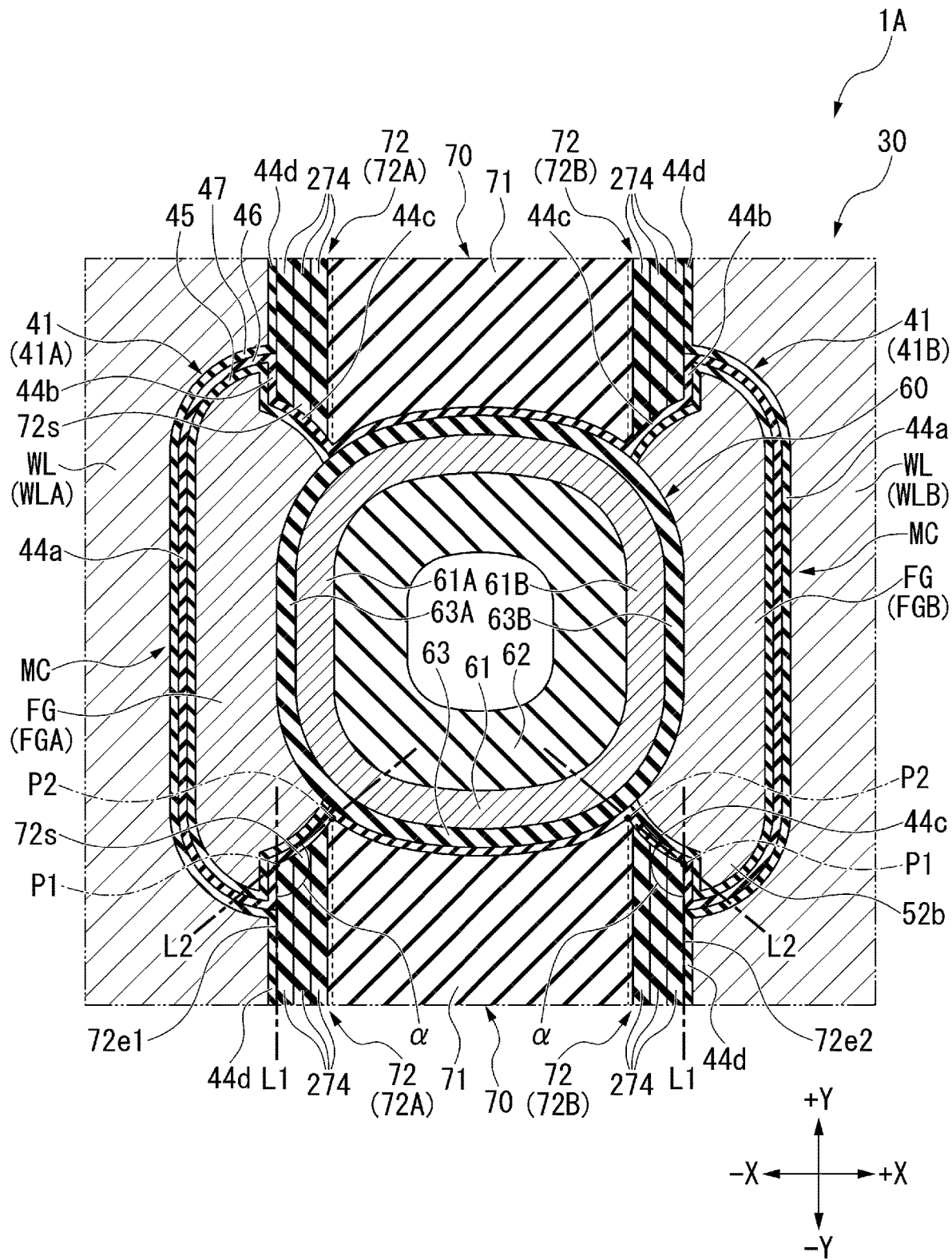
FIG. 7 is a cross-sectional view illustrating a memory cell array of a semiconductor memory device according to a second embodiment.

FIG. 7 is a cross-sectional view illustrating the memory cell array 2 of a semiconductor memory device 1A of the second embodiment. In the present embodiment, the second insulating portion 72 includes the plurality of thin film insulating films 274. For example, the plurality of thin film insulating films 274 are provided at the end of the second insulating portion 72A in the −X direction (that is, in the boundary portion between the second insulating portion 72A and the first word line WLA). Further, the plurality of thin film insulating films 274 are provided at the end of the second insulating portion 72B in the +X direction (that is, in the boundary portion between the second insulating portion 72B and the second word line WLB). The plurality of thin film insulating films 274 are stacked in the X direction. The film thickness of each thin film insulating film 274 is 10 nm or less, for example. For example, the thin film insulating film 274 includes the same material and the same composition as the first insulating portion 71. The thin film insulating film 274 is the same as the first insulating portion 71 in terms of the film formation temperature, the crystallization rate, and the content of impurity, for example. However, the thin film insulating film 274 may have a different material or a different composition from the first insulating portion 71. The thin film insulating film 274 is an example of the "insulating film".

Next, among the manufacturing processes of the semiconductor memory device 1A, a process of forming the first insulating layer 70 including the thin film insulating film 274 will be described. Among the manufacturing processes of the semiconductor memory device 1A, the manufacturing processes other than the first insulating layer 70 are the same as those of the first embodiment, and thus the description thereof will be omitted.

FIGS. 8A to 8D are cross-sectional views illustrating a part of the manufacturing process of the semiconductor memory device 1A of the second embodiment. The section (a) in each drawing is a cross-sectional view of the section (b) taken along the line a-a in each drawing. The section (b) in each drawing is a cross-sectional view of the section (a) taken along the line b-b in each drawing.

Figure 8A:
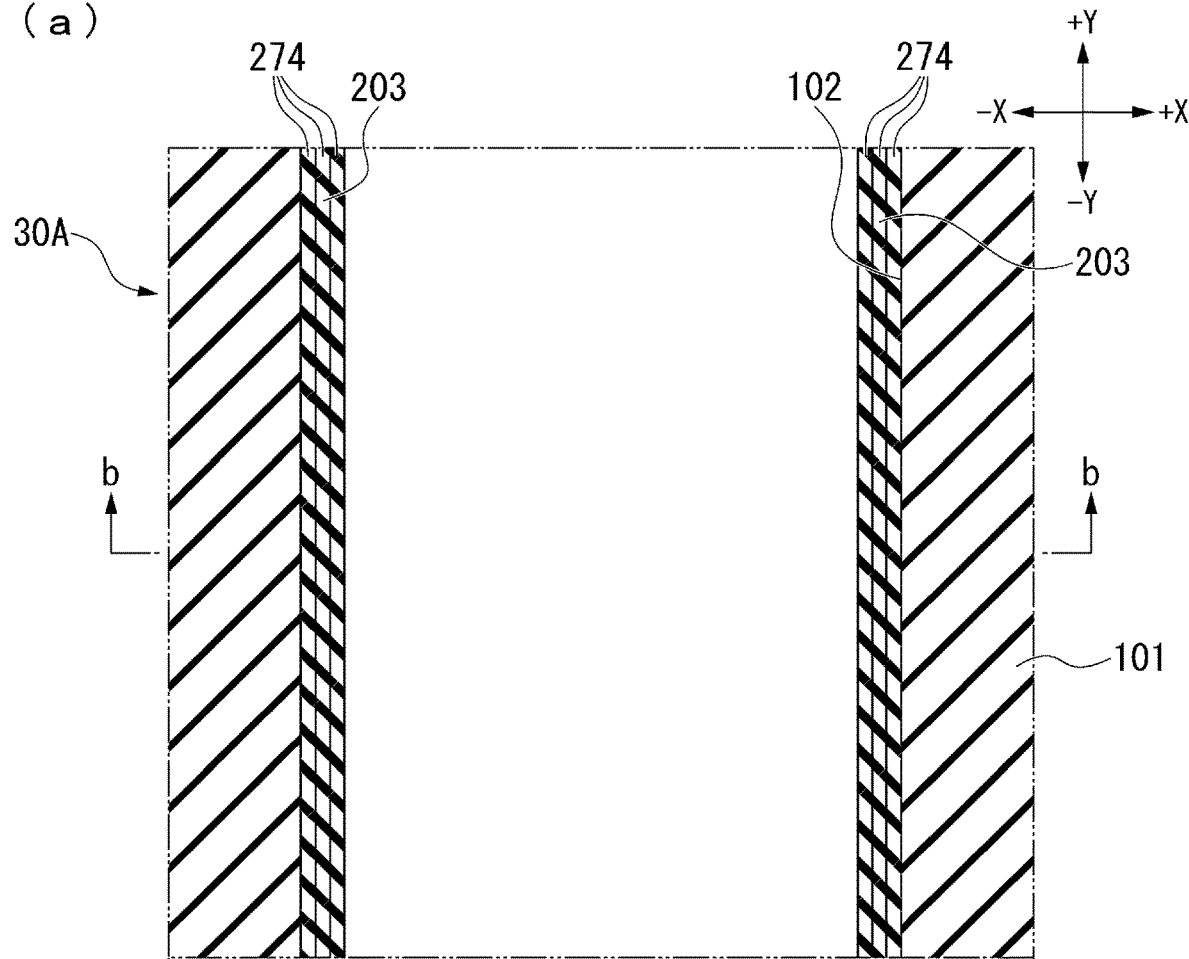
FIG. 8A is a cross-sectional view of a part of a manufacturing process of the semiconductor memory device according to the second embodiment.
Figure 8A:
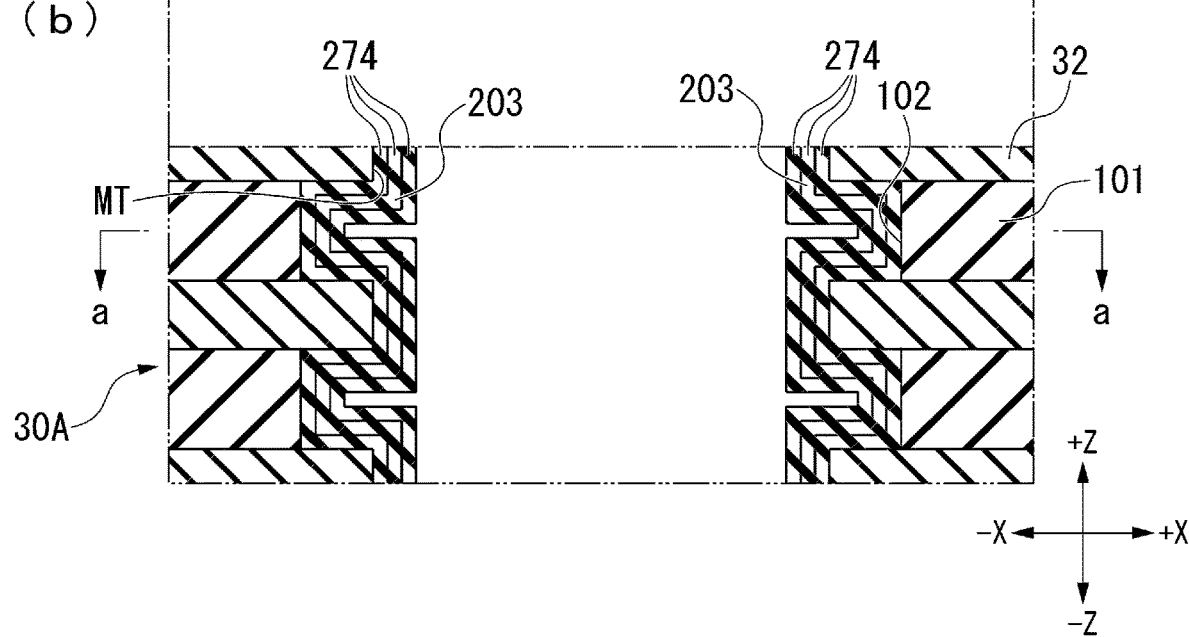

After the formation of the memory trench MT, as illustrated in FIG. 8A, for example, by LTO film formation, a plurality of first intermediate films 203 formed of silicon oxide are formed on the inner surface of the memory trench MT. The first intermediate film 203 includes the plurality of thin film insulating films 274.

Figure 8B:
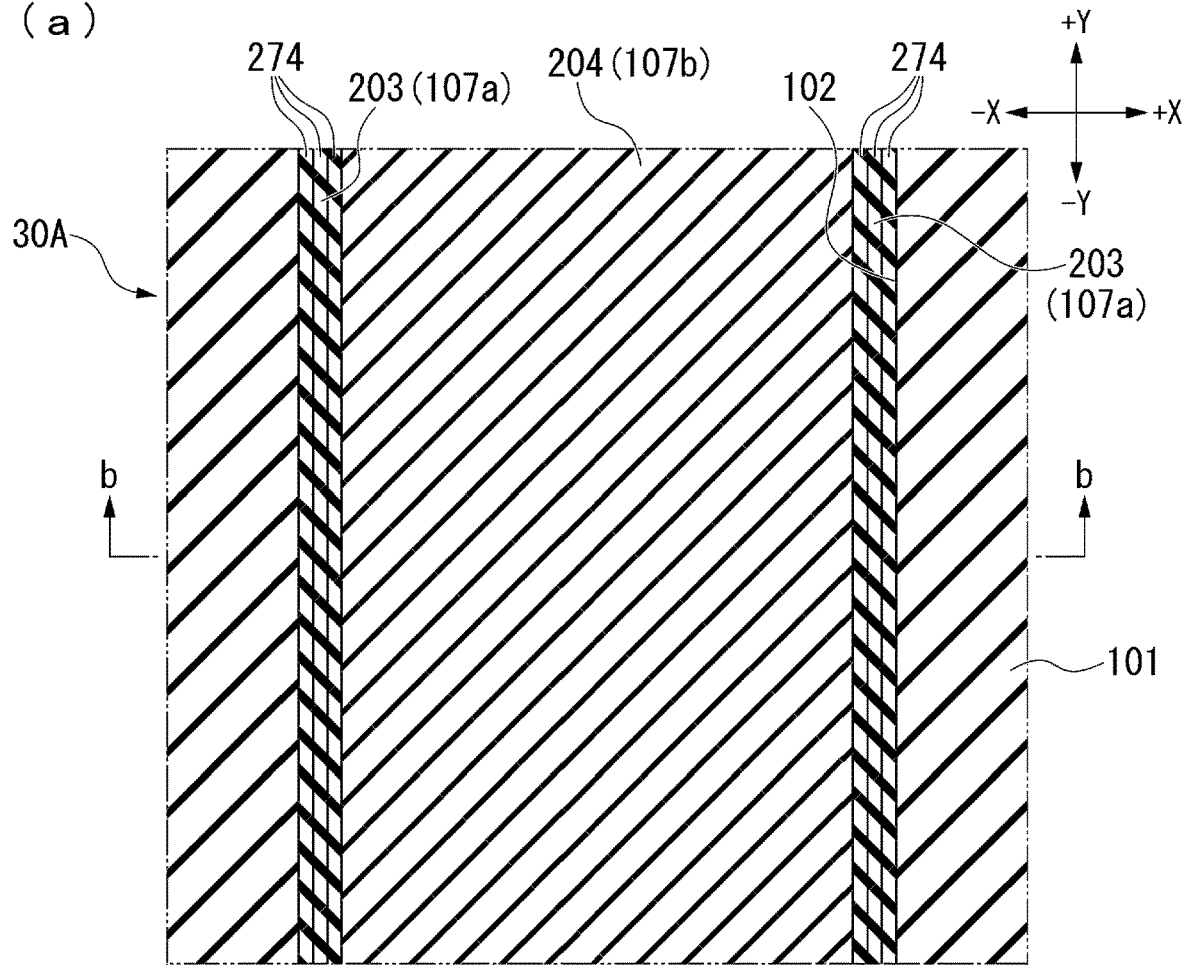
FIG. 8B is a cross-sectional view illustrating a part of the manufacturing process of the semiconductor memory device according to the second embodiment.
Figure 8B:
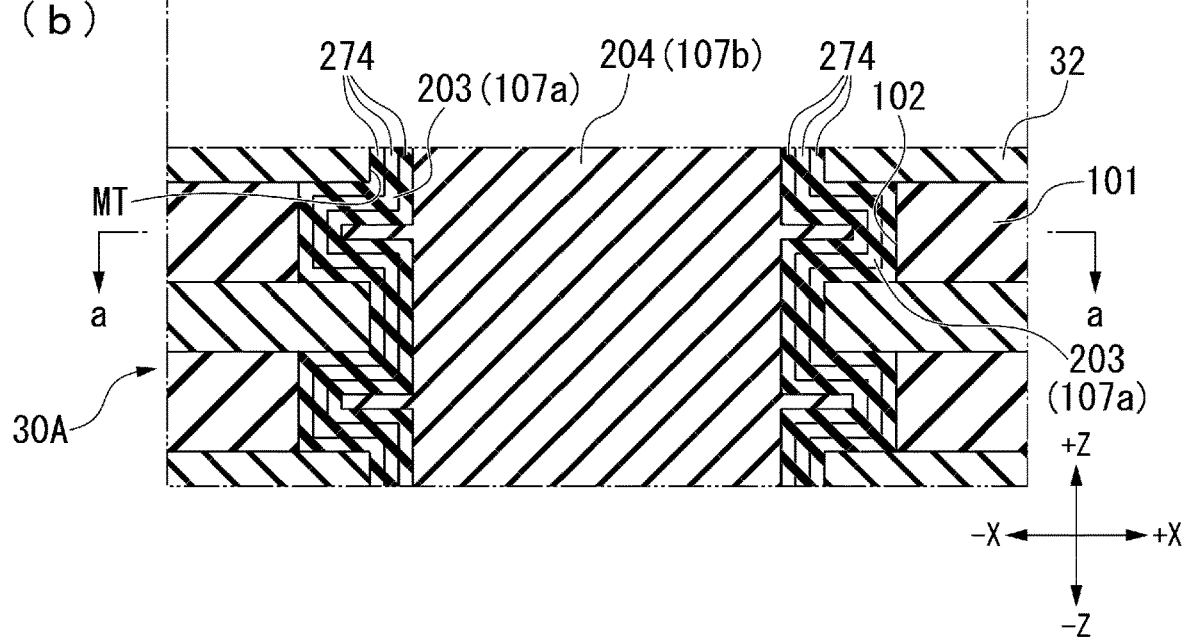

Next, as illustrated in FIG. 8B, by the LTO film formation, the second intermediate film 204 formed of silicon oxide is filled in the memory trench MT. The first intermediate film 203 and the second intermediate film 204 are changed into the intermediate insulating layer 107 by the RTA or the like, for example. The intermediate insulating layer 107 includes a first intermediate insulating layer 107a and a second intermediate insulating layer 107b. The first intermediate film 203 is formed into the first intermediate insulating layer 107a by the RTA and the like described above. The second intermediate film 204 is formed into the second intermediate insulating layer 107b by the RTA and the like described above.

Figure 8C:
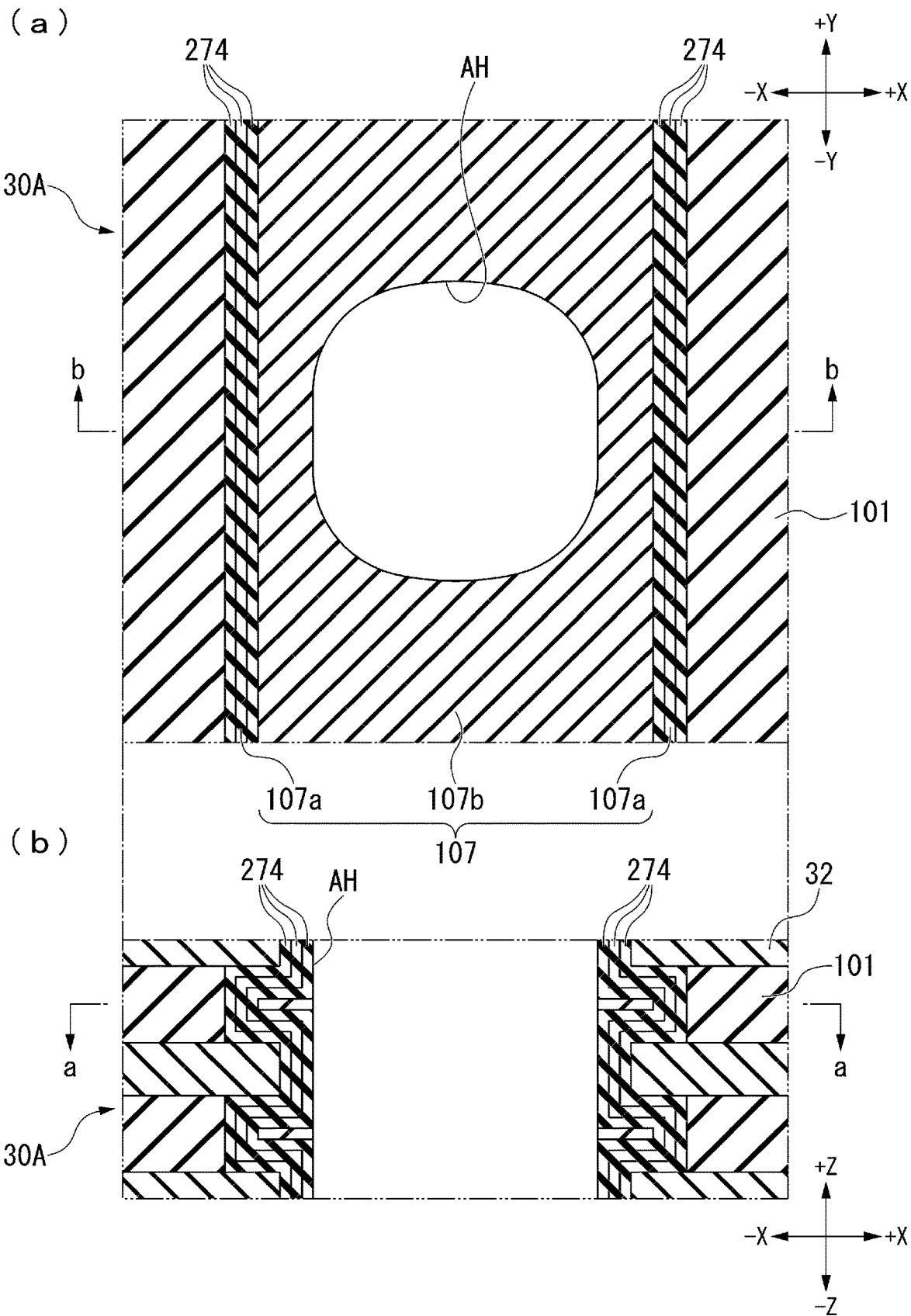
FIG. 8C is a cross-sectional view illustrating a part of the manufacturing process of the semiconductor memory device according to the second embodiment.
Figure 8D:
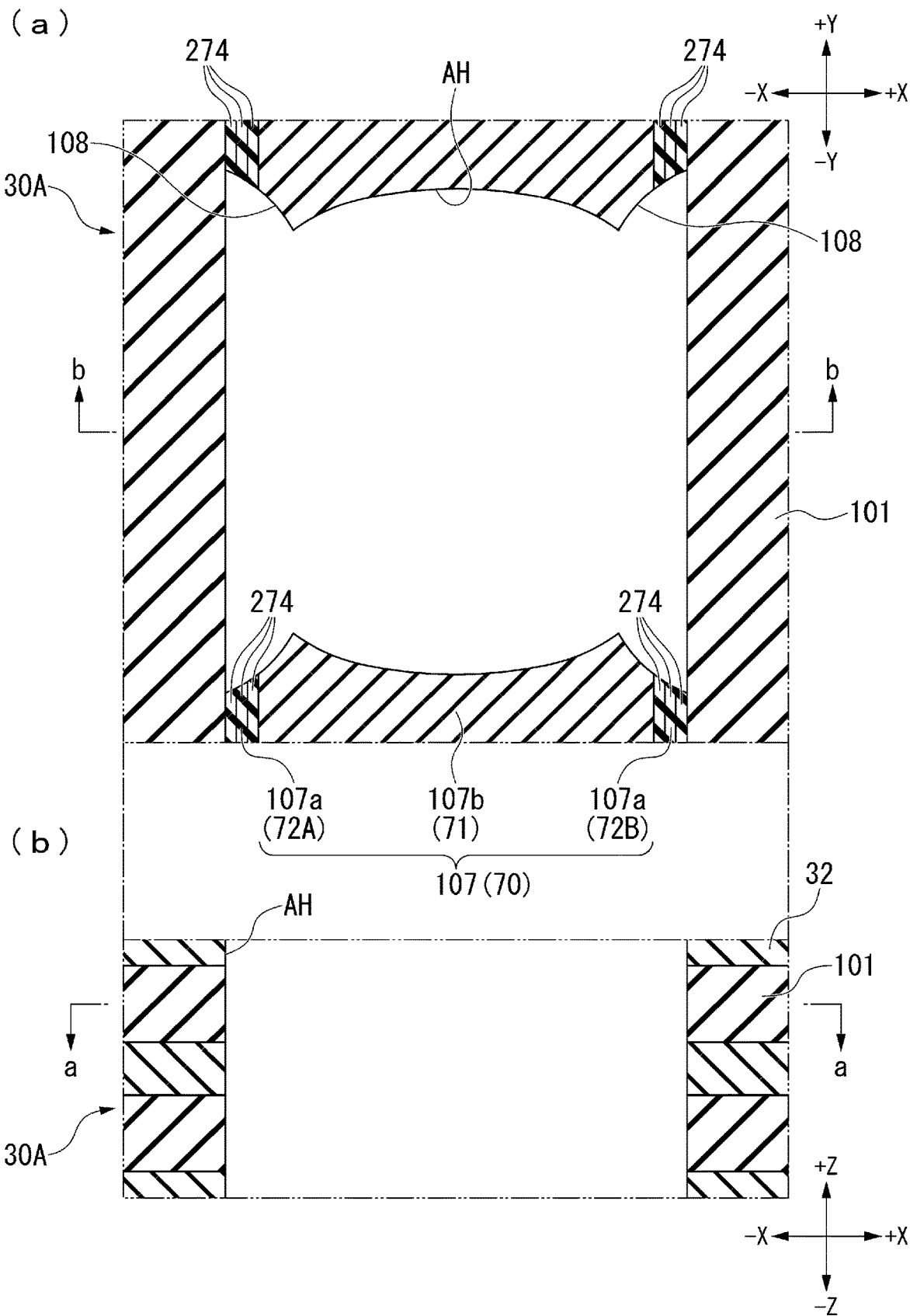
FIG. 8D is a cross-sectional view illustrating a part of the manufacturing process of the semiconductor memory device according to the second embodiment.

After that, as illustrated in FIG. 8C, the memory hole AH is formed, and then, as shown in FIG. 8D, the first etchant is supplied to the memory hole AH, and the first space portion 108 connected to the memory hole AH is formed. In the present embodiment, since the second insulating portion 72 includes the plurality of thin film insulating films 274, a plurality of interfaces (interfaces between the thin film insulating films 274) are present in the second insulating portion 72, and the resistance to wet etching is smaller as compared with that of the first insulating portion 71. Therefore, the first etchant is supplied to the memory hole AH, and the first space portion 108 connected to the memory hole AH is formed.

By the processes described above, the intermediate insulating layer 107 is formed into the first insulating layer 70 described above. That is, the second intermediate insulating layer 107b is formed into the first insulating portion 71, and the first intermediate insulating layer 107a is formed into the second insulating portion 72.

In the present embodiment, the second insulating portion 72 includes the plurality of thin film insulating films 274 having a film thickness of 10 nm or less in the X direction. According to such a configuration, the number of interfaces between the thin film insulating films 274 in the second insulating portion 72 increases. As a result, the etching resistance of the second insulating portion 72 can be lowered without changing the film forming method, composition, and the like of the second insulating portion 72 as compared with the first insulating portion 71.

Third Embodiment

Next, a third embodiment will be described. The third embodiment is different from the first embodiment in that the second insulating portion 72 is formed by replacing it with a heterogeneous insulating film 374A. The configuration other than that described below is the same as that of the first embodiment.

Figure 9:
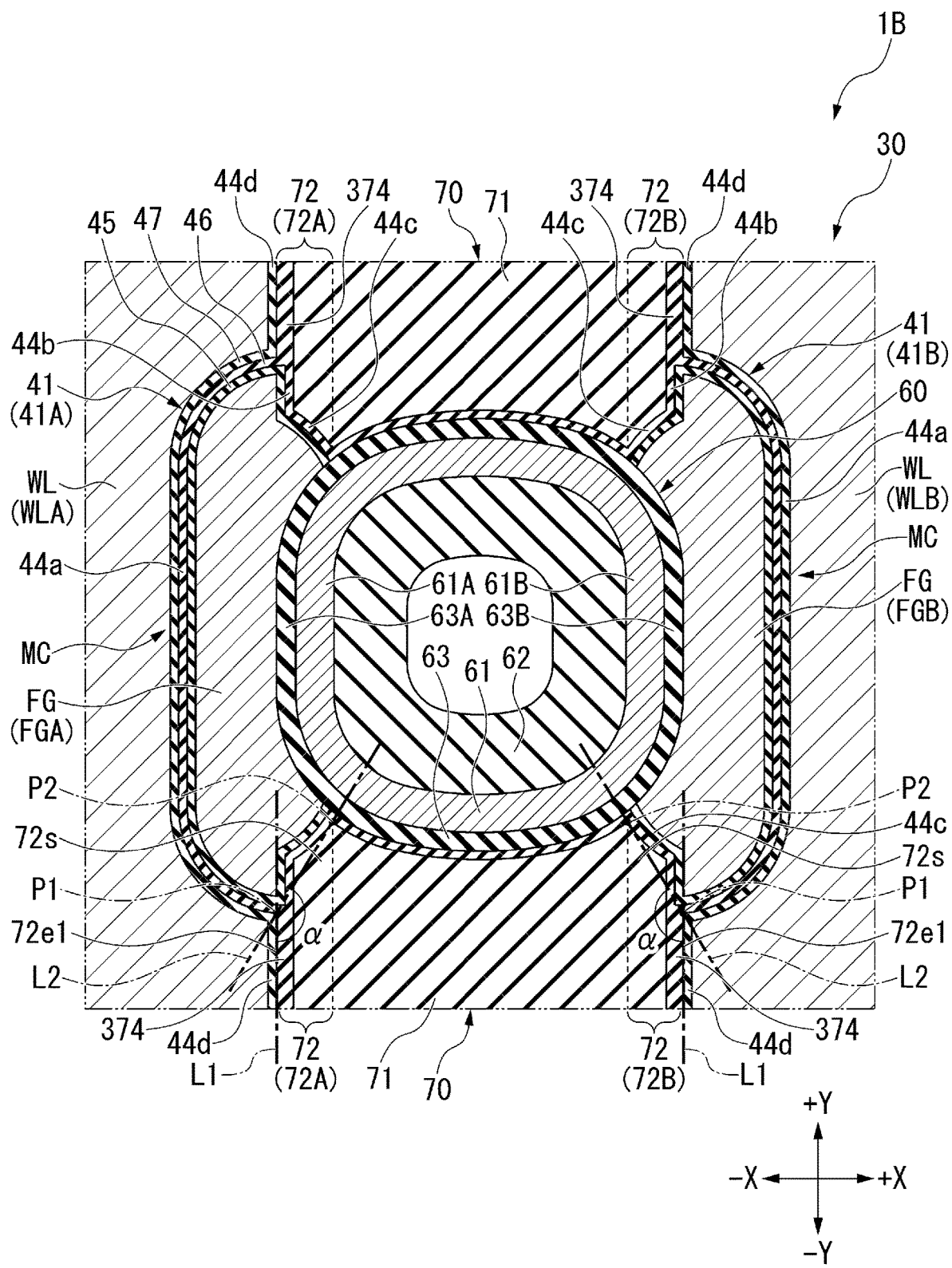
FIG. 9 is a cross-sectional view illustrating a memory cell array of a semiconductor memory device according to a third embodiment.

FIG. 9 is a cross-sectional view illustrating the memory cell array 2 of a semiconductor memory device 1B according to the third embodiment. The second insulating portion 72 of the present embodiment includes an insulating film 374. For example, the insulating film 374 may have the same material and the same composition as the first insulating portion 71, and may be an insulating film equivalent to that of the first insulating portion 71 in terms of resistance to wet etching. In the present embodiment, the material and composition of the insulating film 374 are the same as the material and composition of the block insulating film 41 (e.g., the insulating film 46 of the block insulating film 41), for example. The insulating film 374 is formed by replacing with a heterogeneous insulating film 374A, which will be described below.

Hereinafter, among the manufacturing processes of the semiconductor memory device 1B, a process of forming the second insulating portion 72 will be described. Among the manufacturing processes of the semiconductor memory device 1B, the manufacturing processes other than the second insulating portion 72 are the same as those of the first embodiment, and thus the description thereof will be omitted.

FIGS. 10A to 10G are cross-sectional views illustrating a part of the manufacturing process of the semiconductor memory device 1 of the third embodiment. The section (a) in each drawing is a cross-sectional view of the section (b) taken along the line a-a in each drawing. The section (b) in each drawing is a cross-sectional view of the section (a) taken along the line b-b in each drawing.

Figure 10A:
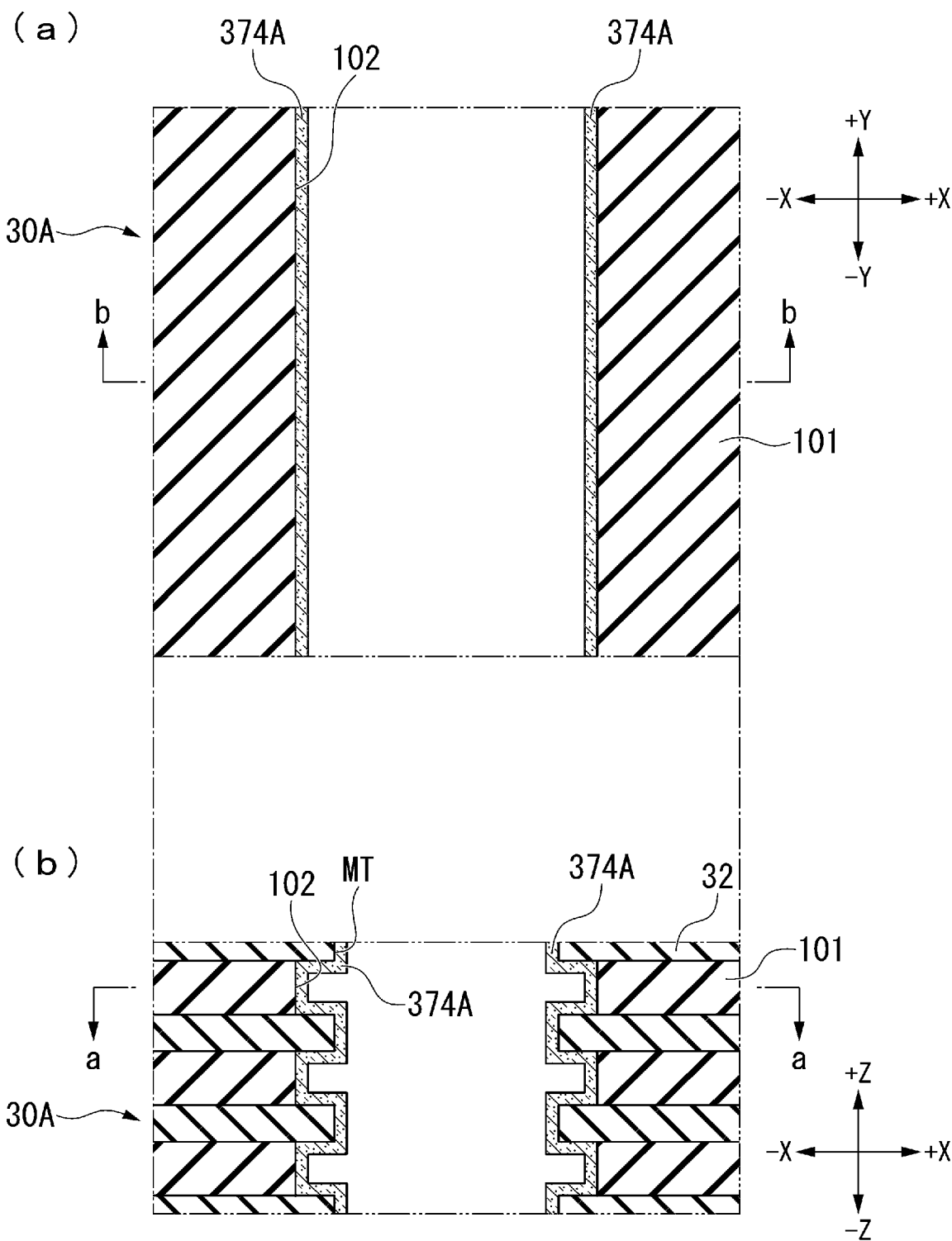
FIG. 10A is a cross-sectional view illustrating a part of a manufacturing process of the semiconductor memory device according to the third embodiment.

FIG. 10A is a diagram illustrating a process corresponding to the process of FIG. 6C of the first embodiment. In the present embodiment, the heterogeneous insulating film 374A is formed on the inner surface of the memory trench MT. For example, the heterogeneous insulating film 374A is a semiconductor film formed of a semiconductor material such as amorphous silicon (a-Si). The heterogeneous insulating film 374A is a film having a weaker resistance to wet etching as compared with the intermediate insulating layer 107b (that is, the first insulating portion 71) to be described below.

Figure 10B:
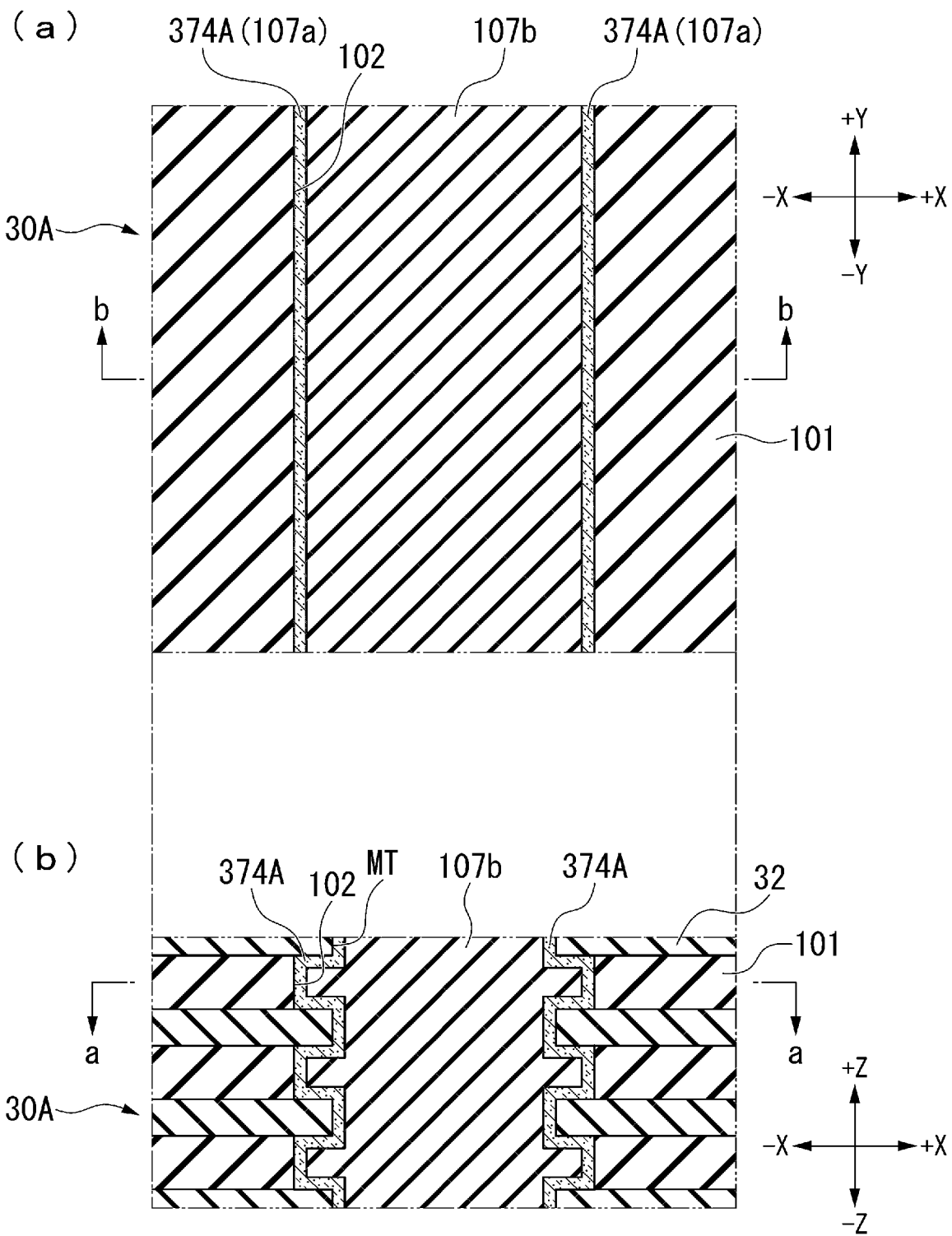
FIG. 10B is a cross-sectional view illustrating a part of the manufacturing process of the semiconductor memory device according to the third embodiment.
Figure 10C:
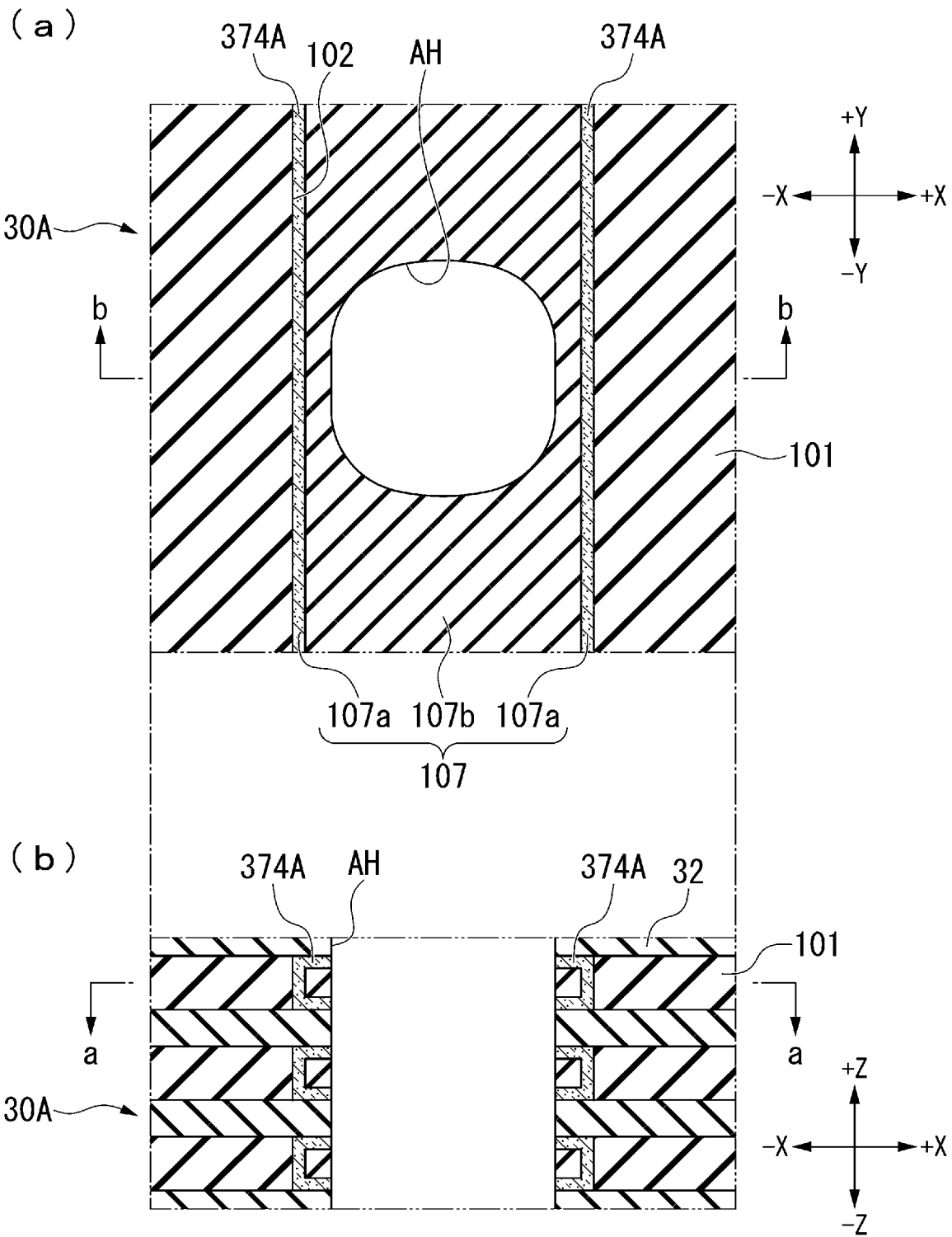
FIG. 10C is a cross-sectional view illustrating a part of the manufacturing process of the semiconductor memory device according to the third embodiment.

Next, as illustrated in FIG. 10B, the intermediate insulating layer 107b formed of silicon oxide is filled in the memory trench MT, as in the first embodiment. Then, as illustrated in FIG. 10C, the memory hole AH is formed by etching.

Figure 10D:
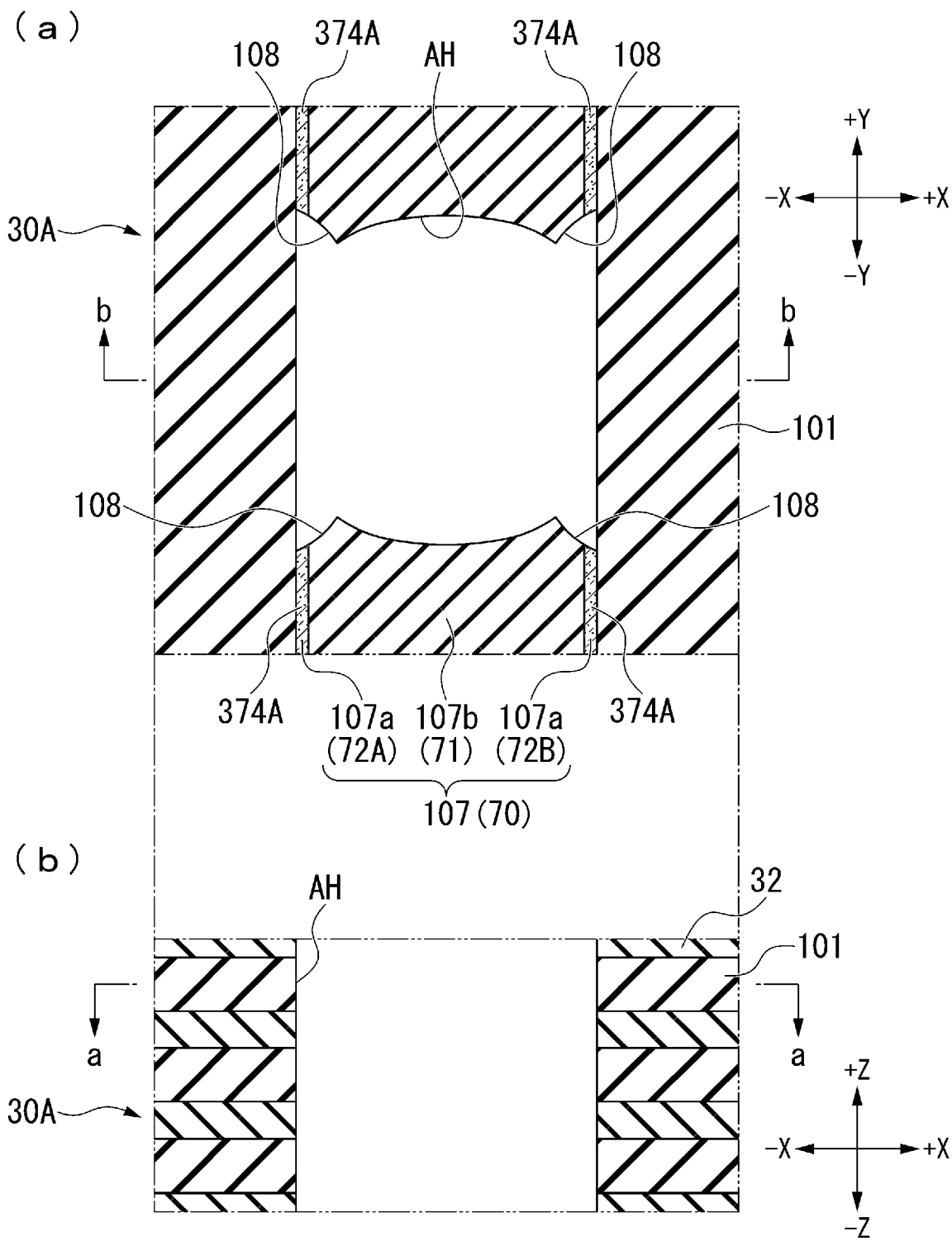
FIG. 10D is a cross-sectional view illustrating a part of the manufacturing process of the semiconductor memory device according to the third embodiment.

Next, as illustrated in FIG. 10D, the first etchant is supplied to the memory hole AH. As a result, the diameter of the memory hole AH is expanded, and also the end of the heterogeneous insulating film 374A exposed to the memory hole AH is removed, and the first space portion 108 connected to the memory hole AH is formed.

Figure 10E:
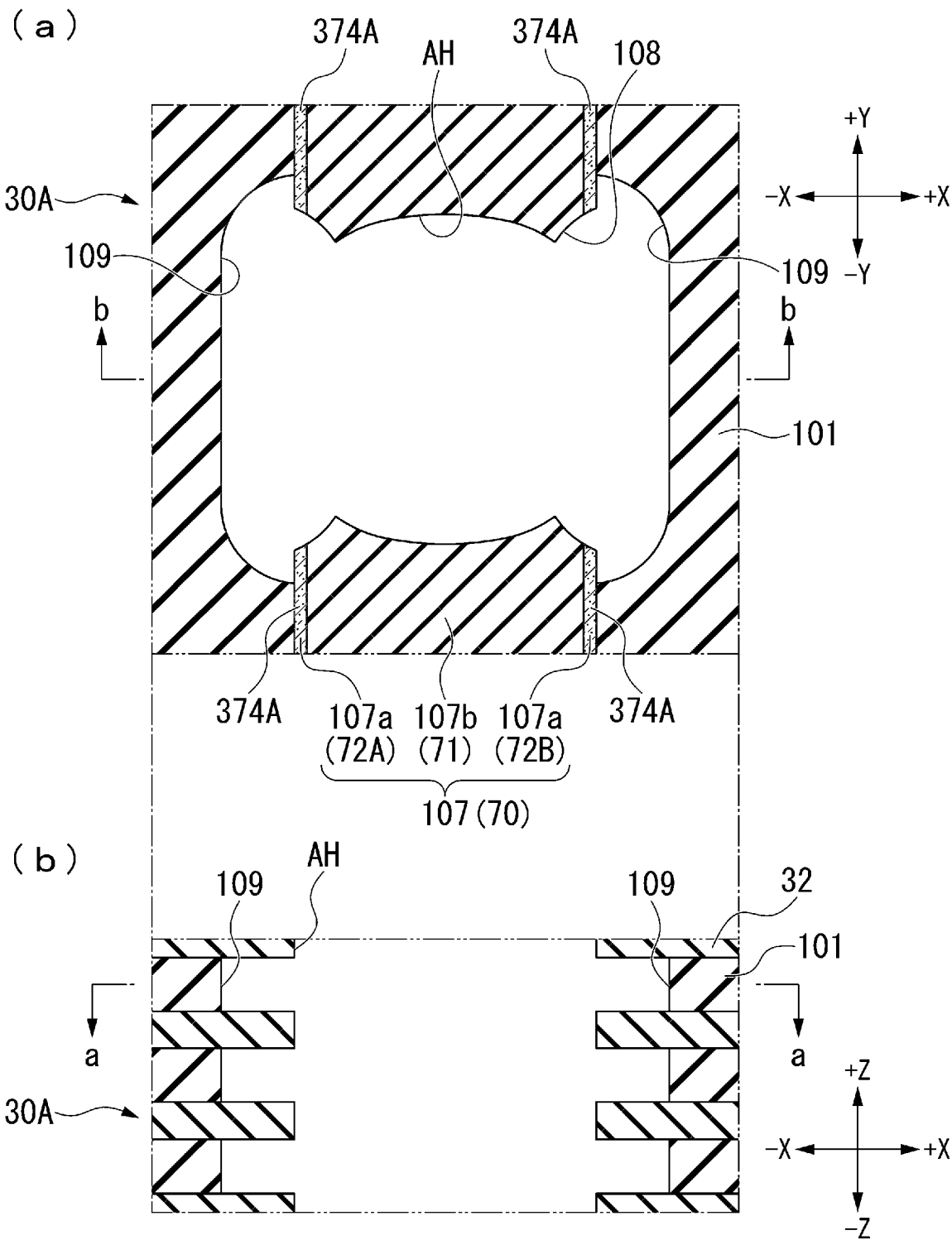
FIG. 10E is a cross-sectional view illustrating a part of the manufacturing process of the semiconductor memory device according to the third embodiment.

Next, as illustrated in FIG. 10E, the second etchant is supplied to the memory hole AH. As a result, a part of the plurality of sacrifice layers 101 exposed to the memory hole AH is removed, and the second space portion 109 connected to the first space portion 108 is formed.

Figure 10F:
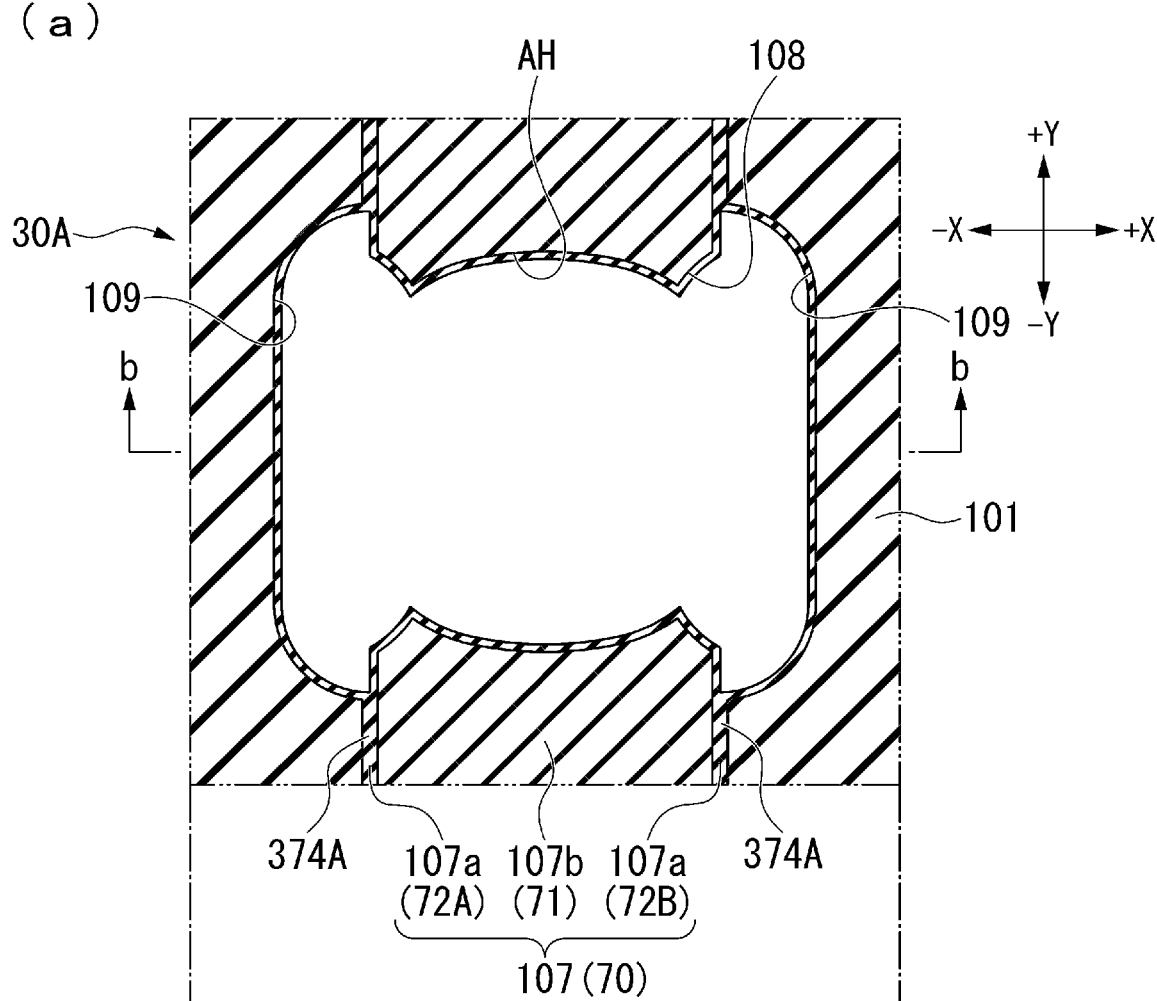
FIG. 10F is a cross-sectional view illustrating a part of the manufacturing process of the semiconductor memory device according to the third embodiment.
Figure 10F:
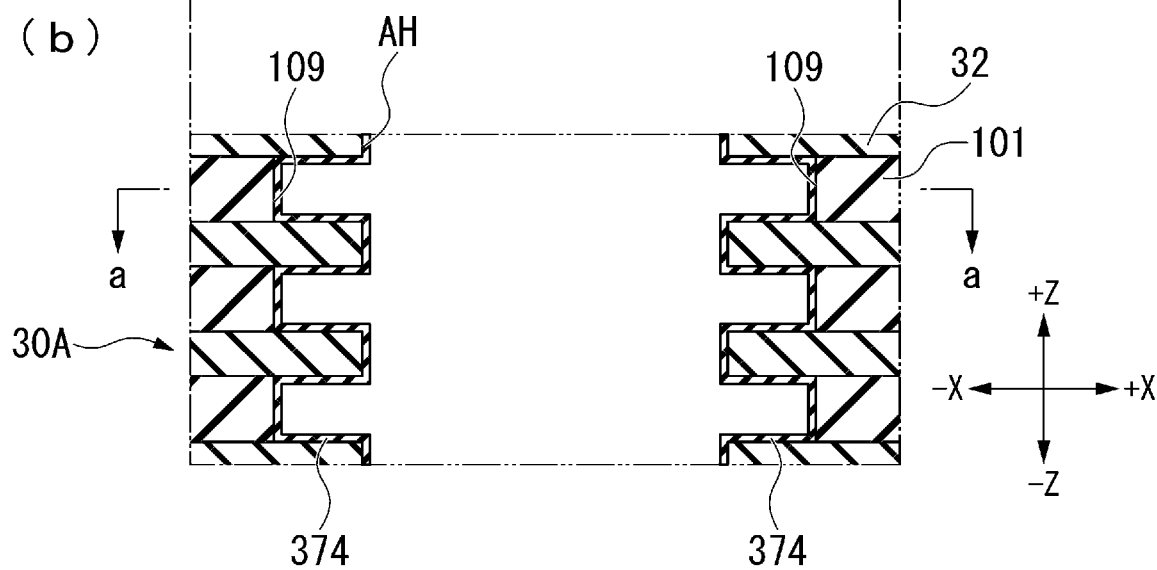
Figure 10G:
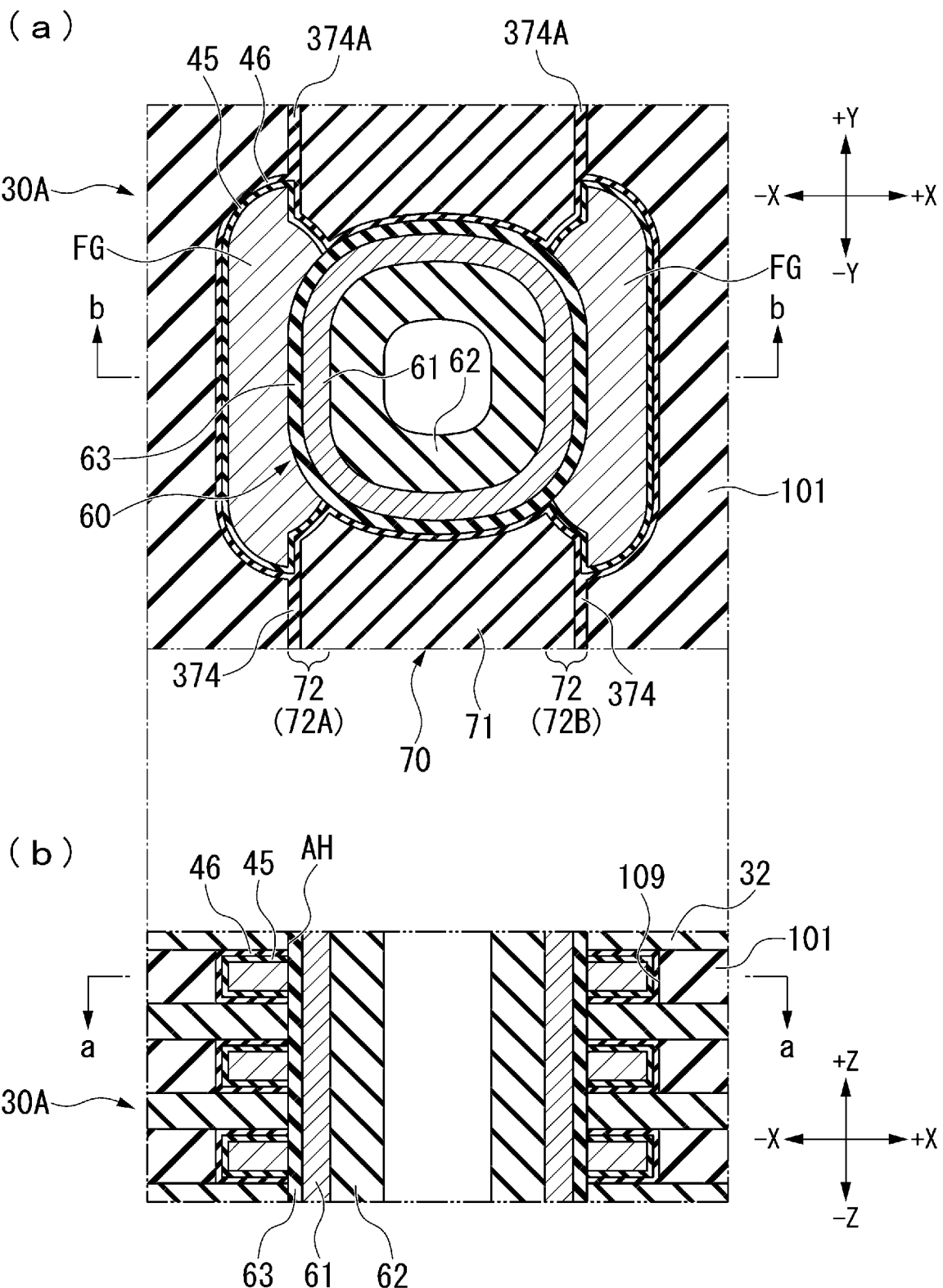
FIG. 10G is a cross-sectional view illustrating a part of the manufacturing process of the semiconductor memory device according to the third embodiment.

Next, as illustrated in FIG. 10F, the heterogeneous insulating film 374A is removed by wet etching, and the insulating material is filled in the space from which the heterogeneous insulating film 374A is removed. As a result, the insulating film 374 positioned at the ends of the first insulating layer in the +X direction and in the −X direction is formed. In the present embodiment, the insulating film 374 is integrally formed with the block insulating film 41 (e.g., the insulating film 46 of the block insulating film 41) in the process of forming the block insulating film 41 (e.g., the insulating film 46 of the block insulating film 41). Then, as illustrated in FIG. 10G, the cell structure MC is formed as in the first embodiment.

According to such a configuration, as in the first embodiment, it is possible to achieve the enhancement of the degree of integration, and it is also possible to achieve the improvement of the electrical characteristics.

Modification of Third Embodiment

Figure 11:
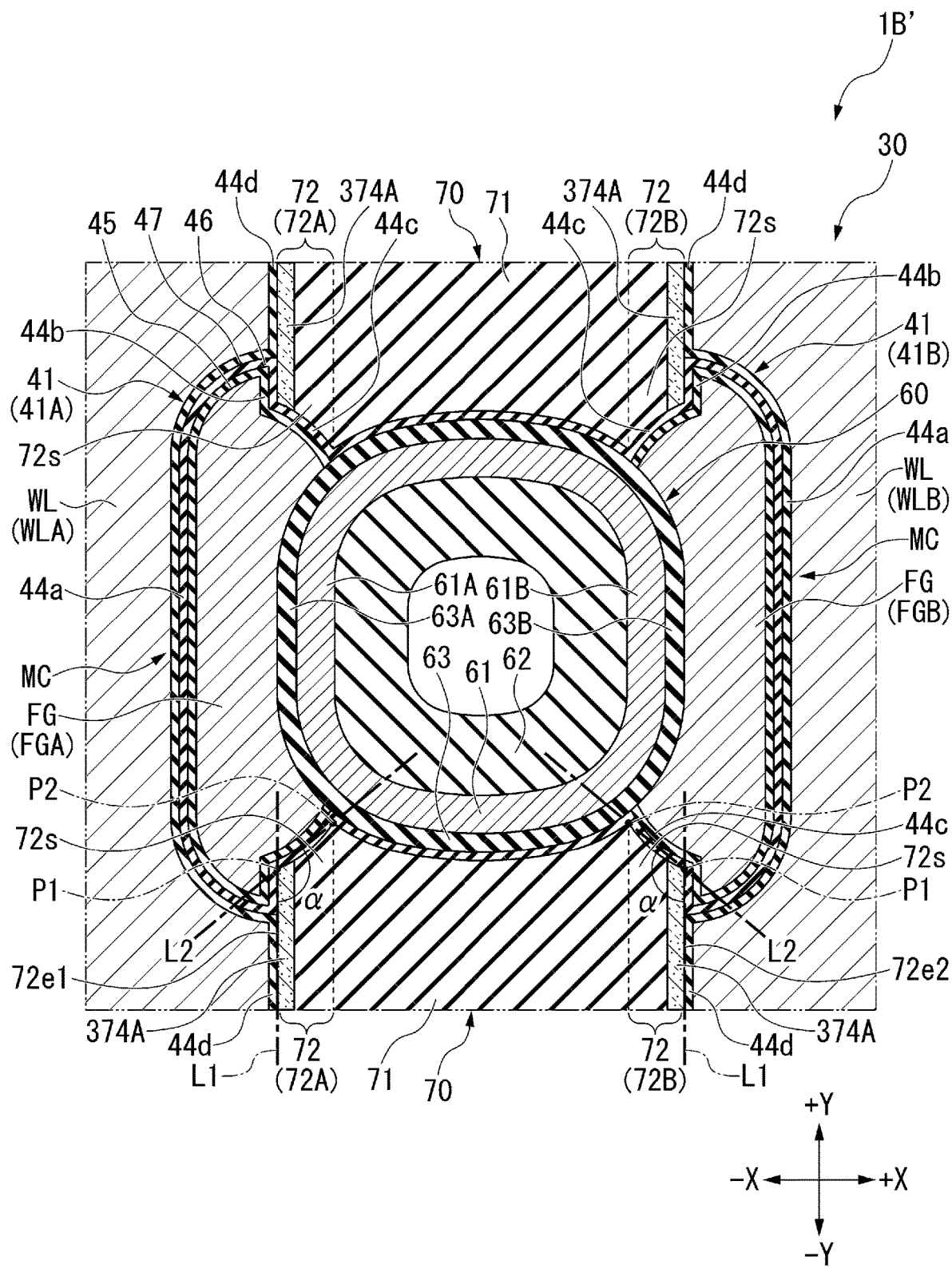
FIG. 11 is a cross-sectional view illustrating a memory cell array of a semiconductor memory device according to a modification of the third embodiment.

FIG. 11 is a cross-sectional view illustrating the memory cell array 2 of a semiconductor memory device 1B' of a modification of the third embodiment. In the third embodiment described above, the heterogeneous insulating film 374A is removed, after which the insulating material is refilled. Meanwhile, this modification has an aspect in which the heterogeneous insulating film 374A is not removed, and the heterogeneous insulating film 374A remains in the final product. For example, the semiconductor memory device 1B' of this modification is formed by performing the process of FIG. 6H of the first embodiment after the process of FIG. 10E described above.

According to such a configuration, as in the first embodiment, it is possible to achieve the enhancement of the degree of integration, and it is also possible to achieve the improvement of the electrical characteristics.

Fourth Embodiment

Next, a fourth embodiment will be described. The fourth embodiment is different from the first embodiment in that the crossing angle α between the first virtual line L1 and the second virtual line L2 is 90 degrees. The configuration other than that described below is the same as that of the first embodiment.

Figure 12:
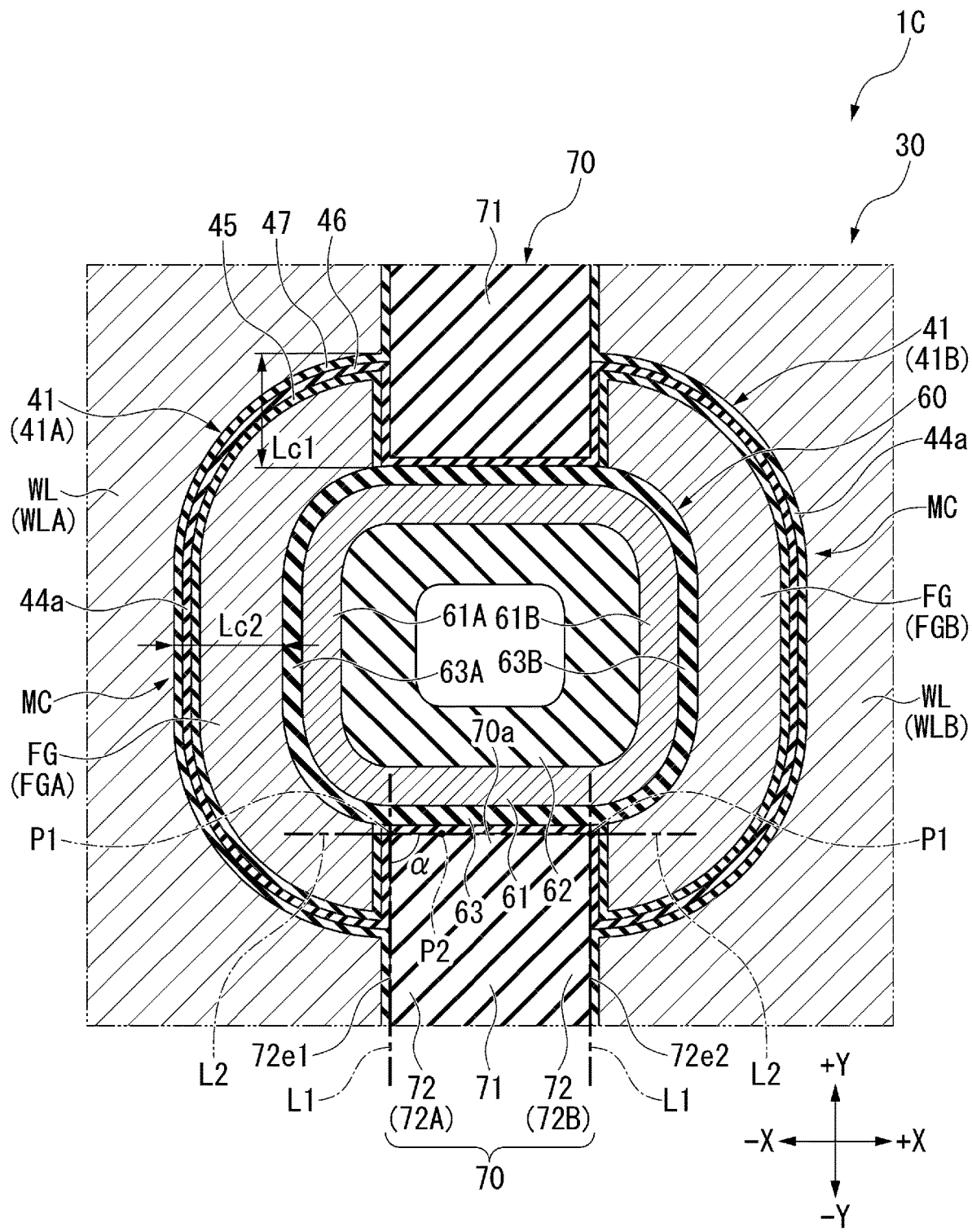
FIG. 12 is a cross-sectional view illustrating a memory cell array of a semiconductor memory device according to a fourth embodiment.

FIG. 12 is a cross-sectional view illustrating the memory cell array 2 of a semiconductor memory device 1C according to the fourth embodiment. In the present embodiment, an end 70a on the pillar 60 side in the Y direction of the first insulating layer 70 has a straight shape extending in the X direction. The shape of the first insulating layer 70 is a rectangular shape extending in the Y direction when viewed from the Z direction. In the present embodiment, the crossing angle α between the first virtual line L1 and the second virtual line L2 is 90 degrees. Further, the ratio of the first dimension Lc1 in the Y direction to the second dimension Lc2 in the X direction of the cell structure MC, that is, the aspect ratio (Lc1/Lc2) of the cell structure MC is 90% or more and less than 100%, for example.

Next, a process of forming the first insulating layer 70 in the manufacturing process of the semiconductor memory device 1C will be described. Among the manufacturing processes of the semiconductor memory device 1C, the manufacturing processes other than the first insulating layer 70 are the same as those of the first embodiment, and thus the description thereof will be omitted.

Figure 13A:
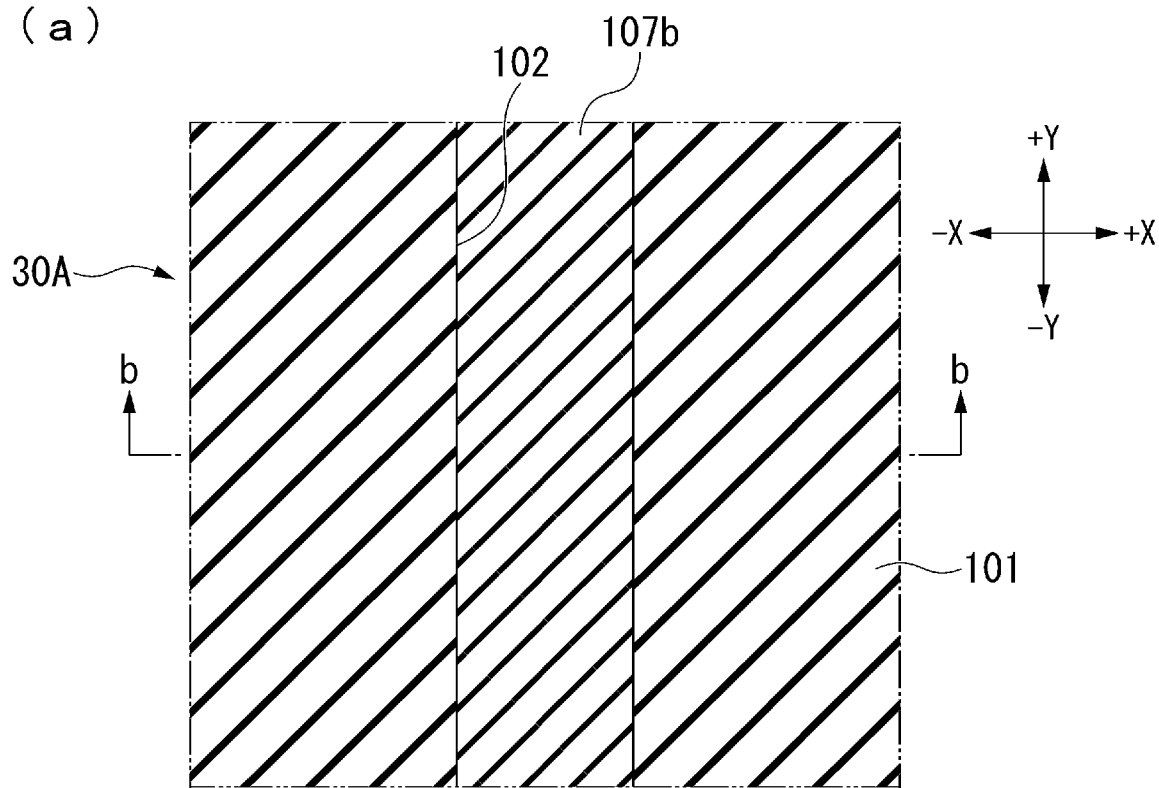
FIG. 13A is a cross-sectional view illustrating a part of a manufacturing process of the semiconductor memory device according to the fourth embodiment.
Figure 13A:
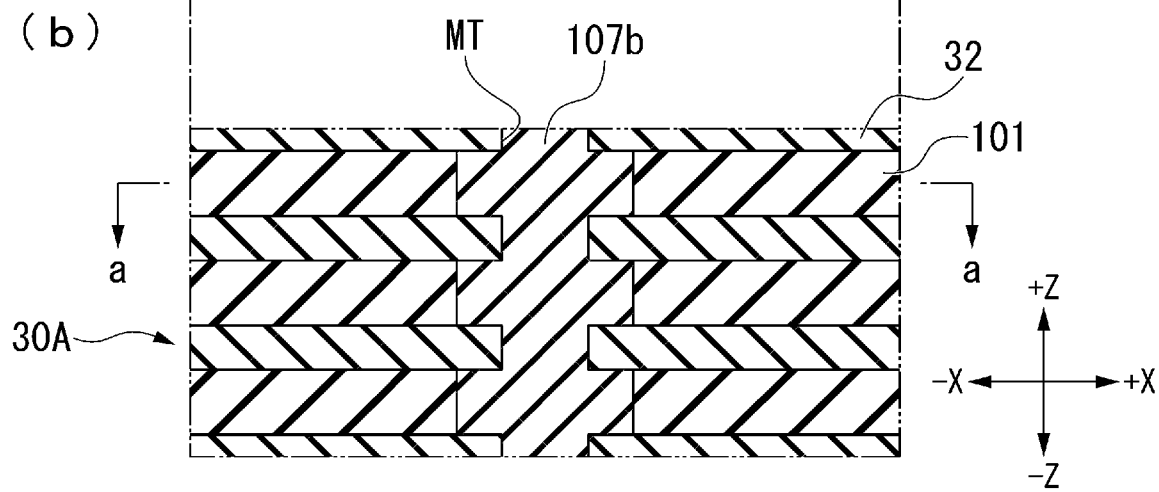
Figure 13B:
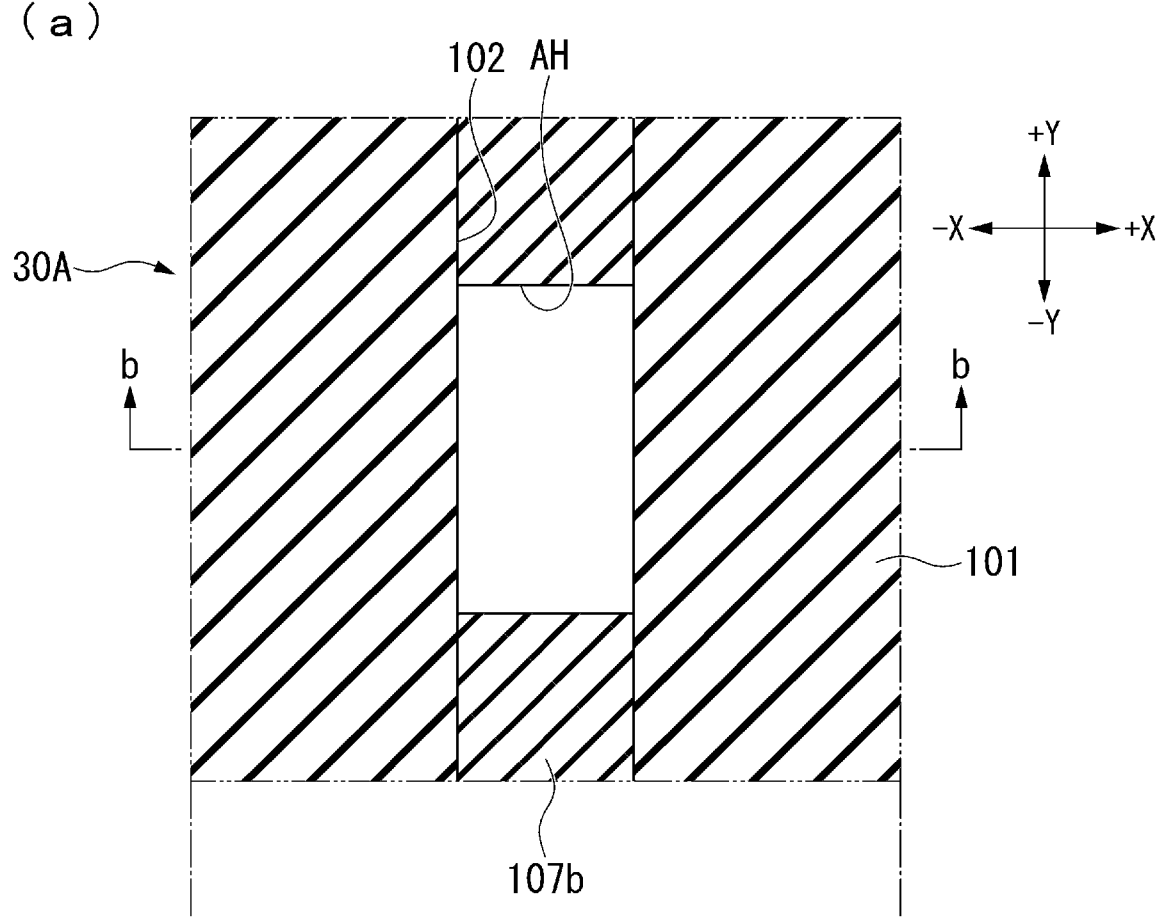
FIG. 13B is a cross-sectional view illustrating a part of the manufacturing process of the semiconductor memory device according to the fourth embodiment.
Figure 13B:
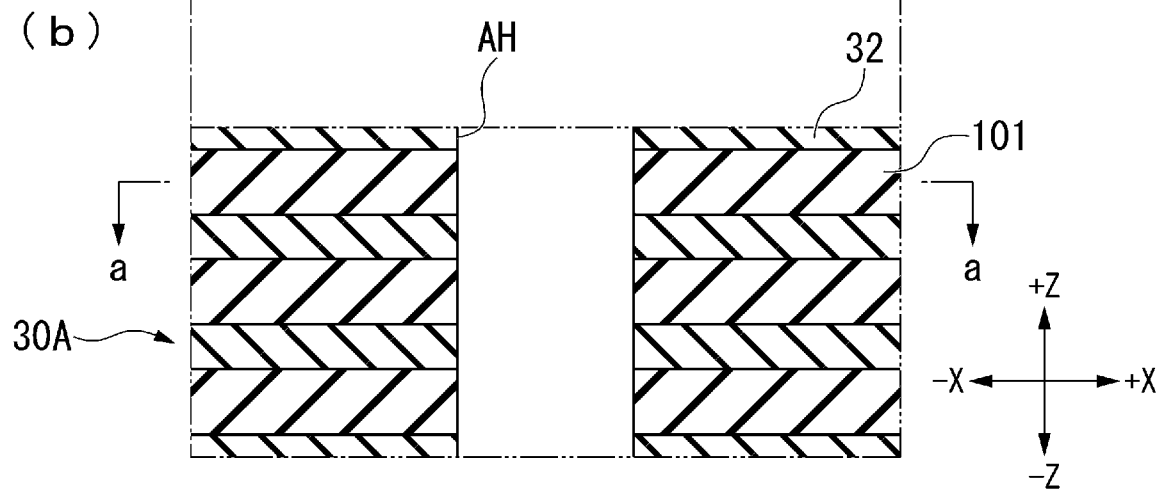
Figure 13C:
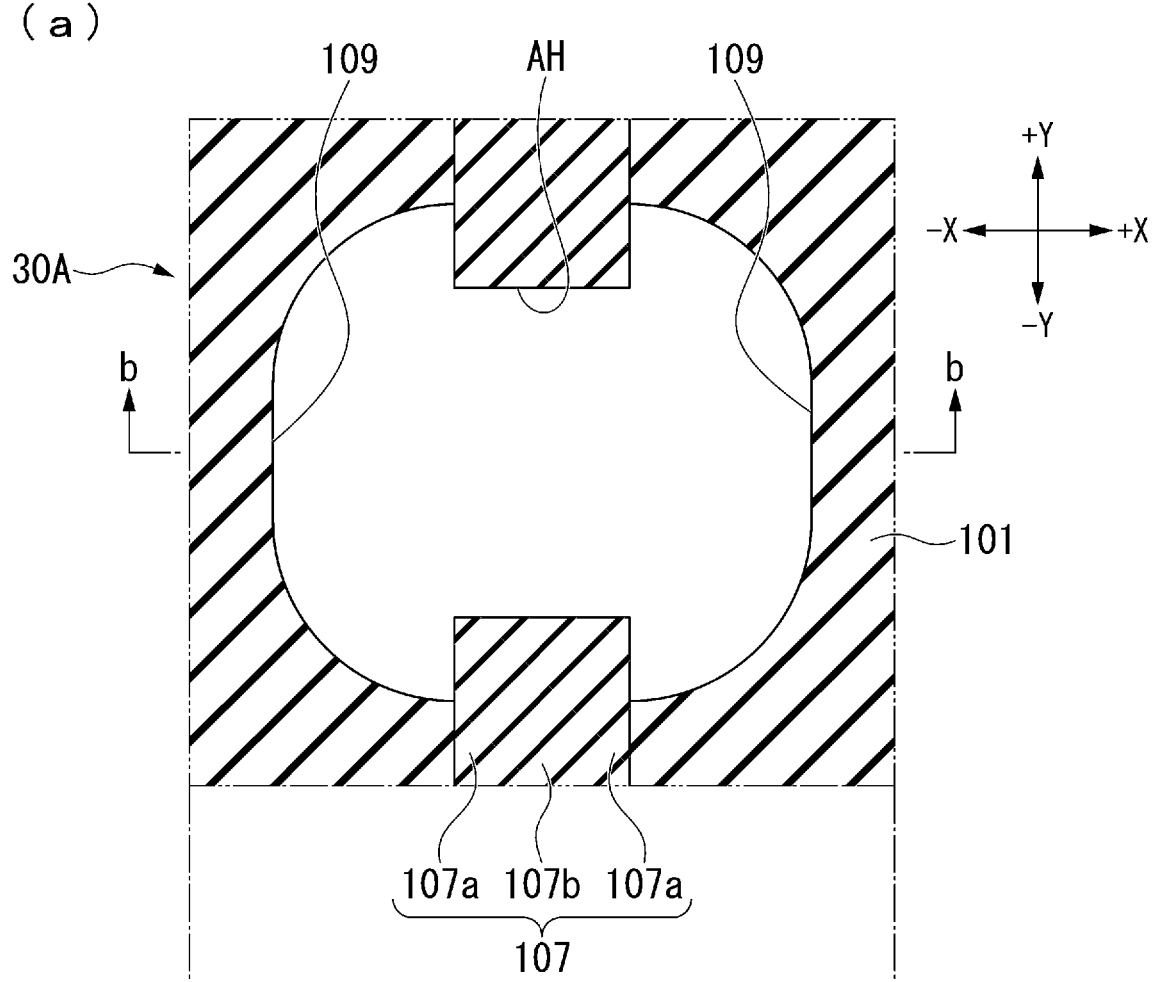
FIG. 13C is a cross-sectional view illustrating a part of the manufacturing process of the semiconductor memory device according to the fourth embodiment.
Figure 13C:
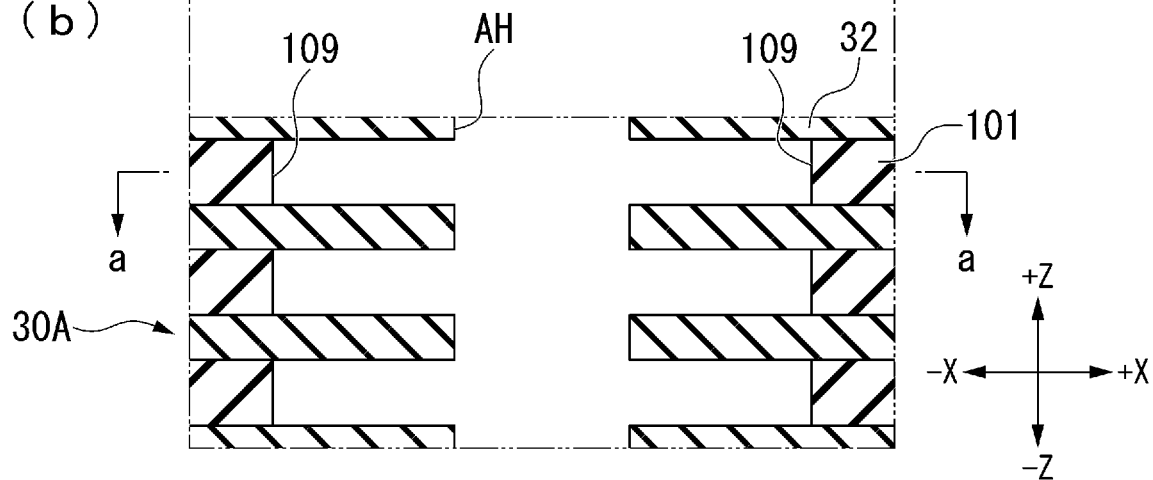

FIGS. 13A to 13C are cross-sectional views illustrating a part of the manufacturing process of the semiconductor memory device 1C of the fourth embodiment. The section (a) in each drawing is a cross-sectional view of the section (b) taken along the line a-a in each drawing. The section (b) in each drawing is a cross-sectional view of the section (a) taken along the line b-b in each drawing.

In the present embodiment, as illustrated in FIG. 13A, the intermediate insulating layer 107b formed of silicon oxide is filled in the memory trench MT. Then, as illustrated in FIG. 13B, the memory hole AH is formed by etching. In the present embodiment, gas is used as an etchant. As a result, the end 70a on the pillar 60 side in the Y direction of the first insulating layer 70 is formed in a straight shape extending in the X direction.

Next, as illustrated in FIG. 13C, the second etchant is supplied to the memory hole AH. As a result, a part of the plurality of sacrifice layers 101 exposed to the memory hole AH is removed, and the second space portion 109 is formed. For example, the semiconductor memory device 1 of the present embodiment is formed by performing the process of FIG. 6H of the first embodiment after the process of FIG. 13C described above.

According to such a configuration, as in the first embodiment, it is possible to achieve the enhancement of the degree of integration, and it is also possible to achieve the improvement of the electrical characteristics.

Modification of First to Fourth Embodiments

Figure 14:
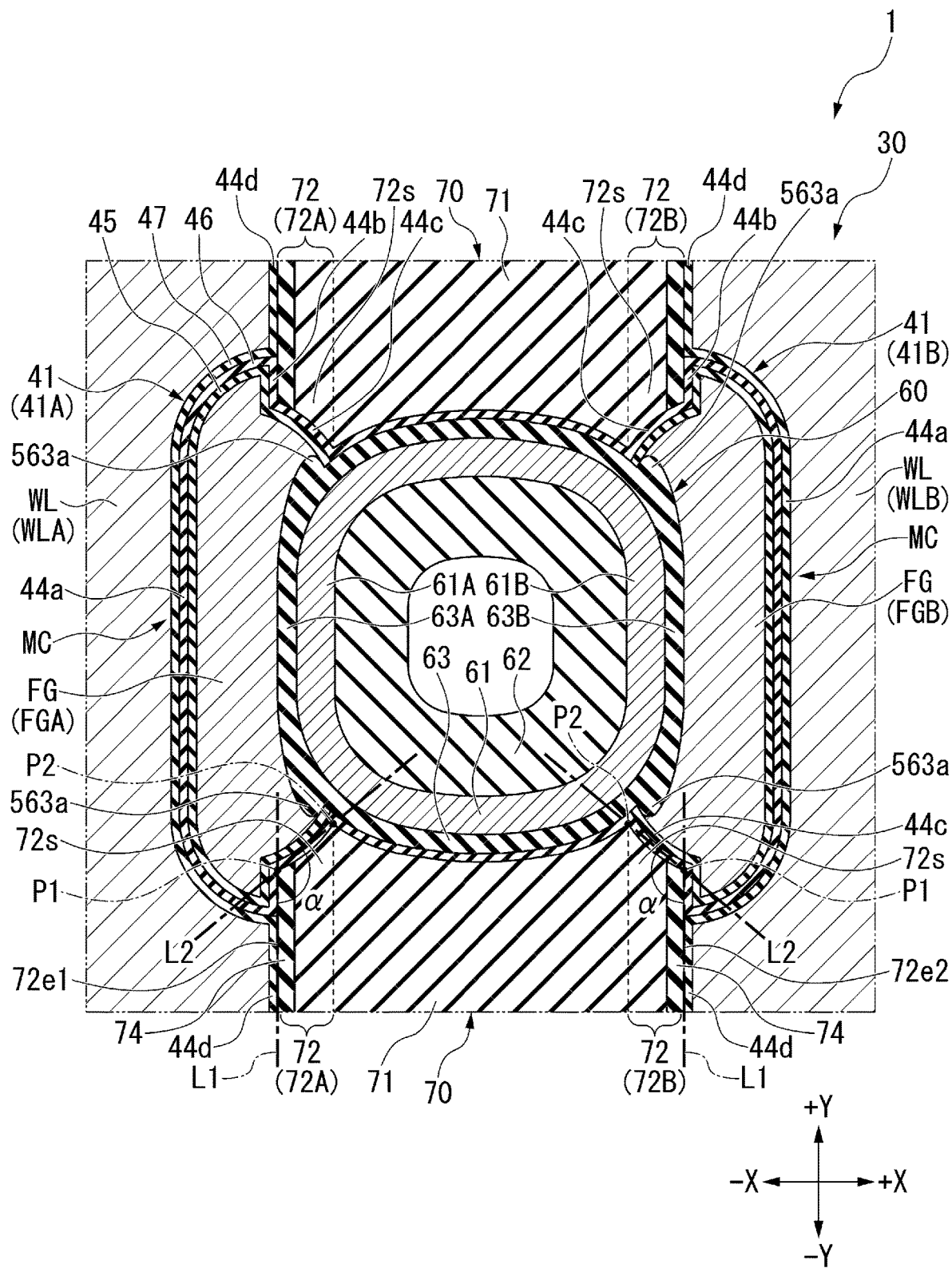
FIG. 14 is a cross-sectional view illustrating a memory cell array of a semiconductor memory device according to a modification of the first to fourth embodiments.

FIG. 14 is a cross-sectional view illustrating the memory cell array 2 of the semiconductor memory device 1 according to a modification of the first to fourth embodiments. In the modification of the first to fourth embodiments, a part 563a of the tunnel insulating film 63 is provided along the inclined portion 72s. That is, the part 563a of the tunnel insulating film 63 is positioned on the side opposite to the inclined portion 72s with respect to a part of the block insulating film 41. According to such a configuration, as in the first embodiment, it is possible to achieve the enhancement of the degree of integration, and it is also possible to achieve the improvement of the electrical characteristics.

Although some embodiments and modifications have been described above, the embodiments are not limited to the examples described above. The "first charge storage unit" and the "second charge storage unit" do not have to be the floating gate electrodes FG. For example, the "first charge storage unit" and the "second charge storage unit" may be charge trap films. In this case, the dimension Lc2 of the cell structure MC in the X direction is smaller as compared with that in the case in which the "first charge storage unit" and the "second charge storage unit" are the floating gate electrodes FG.

As described above, the weakly resistant insulating film 74 does not have to be a film having a lower film formation temperature as compared with the first insulating portion 71. For example, the weakly resistant insulating film 74 may be a film having a lower crystallization rate or a film having a higher content of impurity other than silicon and oxygen as compared with the first insulating portion 71. When the weakly resistant insulating film 74 is a film having a lower crystallization rate as compared with the first insulating portion 71, it is possible to produce the weakly resistant insulating film 74 with the same composition as the first insulating portion 71 and reduce the manufacturing cost, and also it is possible to form the weakly resistant insulating film 74 into a film having a weaker resistance to wet etching as compared with the first insulating portion 71. Further, when the weakly resistant insulating film 74 is a film having a higher content of impurity other than silicon and oxygen as compared with the first insulating portion 71, the resistance of the weakly resistant insulating film 74 to wet etching can be easily adjusted. Examples of other impurities in the weakly resistant insulating film 74 include carbon and the like.

According to at least one embodiment described above, the semiconductor memory device includes a first insulating layer. The first insulating layer is provided between a first wiring and a second wiring along with a columnar insulating portion in the first direction, with at least a part thereof being provided between a first charge storage unit and a second charge storage unit. The first insulating layer includes a first edge positioned at an end of the first insulating layer in a second direction and extending in a first direction. When it is assumed that a position closest to the columnar insulating portion on the first edge is a first position, a position of the first insulating layer, which is different from the first edge and is closest to the columnar insulating portion, is a second position, a virtual line along the first edge is a first virtual line, and a virtual line connecting the first position and the second position is a second virtual line, a crossing angle between the first virtual line and the second virtual line as seen from an inside of the first insulating layer is 90 degrees or more. According to such a configuration, it is possible to achieve high performance of the semiconductor memory device.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor memory device, comprising:
   a first wiring extending in a first direction;
   a second wiring extending in the first direction and spaced from the first wiring in a second direction intersecting with the first direction;
   a columnar insulating portion positioned between the first wiring and the second wiring and extending in a third direction intersecting the first direction and the second direction;
   a first channel portion positioned between the first wiring and the columnar insulating portion and extending in the third direction;
   a first charge storage structure positioned between the first wiring and the first channel portion;
   a second channel portion positioned between the second wiring and the columnar insulating portion and extending in the third direction;
   a second charge storage structure positioned between the second wiring and the second channel portion; and
   a first insulating layer provided between the first wiring and the second wiring along with the columnar insulating portion in the first direction, and having at least a portion being provided between the first charge storage structure and the second charge storage structure,
   wherein the first insulating layer includes a first edge positioned at an end of the first insulating layer in the second direction and extending in the first direction,
   in cross sections along the first direction and the second direction, when it is assumed that a position closest to the columnar insulating portion on the first edge is a first position, a position of the first insulating layer, which is different from the first edge and is closest to the columnar insulating portion, is a second position, a virtual line along the first edge is a first virtual line, and a virtual line connecting the first position and the second position is a second virtual line, a crossing angle between the first virtual line and the second virtual line as seen from an inside of the first insulating layer is 90 degrees or more, the first insulating layer comprises a first end including the first edge, and a first insulating portion of the first insulating layer spaced from the first edge in the second direction, and the first end includes an inclined portion inclined to the first insulating portion with approaching the columnar insulating portion in the first direction.

2. The semiconductor memory device according to claim 1, further comprising a first insulating film positioned between the first wiring and the first charge storage structure, wherein a part of the first insulating film is provided along the inclined portion.

3. The semiconductor memory device according to claim 1, comprising a columnar body including the columnar insulating portion, a channel layer including the first channel portion and the second channel portion, and a second insulating film surrounding the channel layer, wherein the columnar body includes a portion parallel to the inclined portion in the first direction, and a total dimension, including a dimension of the inclined portion in the first direction and half of the dimension of the portion of the inclined portion in the first direction, is equal to or greater than a half of a maximum dimension of the columnar body in the first direction.

4. The semiconductor memory device according to claim 1, wherein the first end includes one or more insulating films having a weaker resistance to wet etching as compared with the first insulating portion.

5. The semiconductor memory device according to claim 4, wherein the one or more insulating films are films having a lower film formation temperature, a lower crystallization rate, or a higher content of impurity other than silicon and oxygen as compared with the first insulating portion.

6. The semiconductor memory device according to claim 1, wherein the first end includes a plurality of insulating films having a film thickness of 10 nm or less in the second direction.

7. The semiconductor memory device according to claim 1, wherein the first end includes a heterogeneous insulating film having a material different from that of the first insulating portion.

8. The semiconductor memory device according to claim 7, wherein the heterogeneous insulating film is a semiconductor film.

9. The semiconductor memory device according to claim 1, comprising:

a first insulating film positioned between the first wiring and the first charge storage structure; and a columnar body including the columnar insulating portion, a channel layer including the first channel portion and the second channel portion, and a second insulating film surrounding the channel layer, wherein the first charge storage structure includes a central portion provided at a position that bisects the dimension of the first charge storage structure in the first direction, and in a region positioned on one side of the first direction with respect to the central portion of the first charge storage structure, when it is assumed that a dimension in the first direction between the first end of the first insulating film in the first direction and a position farthest from the first end in the first direction at an interface between the first insulating film and the second insulating film is a first dimension, and a dimension in the second direction between an outer peripheral surface of the first insulating film and an outer peripheral surface of the second insulating film at a position aligned with the first insulating portion of the first charge storage structure in the second direction is a second dimension, a ratio of the first dimension to the second dimension is 60% or more.

10. The semiconductor memory device according to claim 9, wherein the ratio of the first dimension to the second dimension is 80% or more.

11. A semiconductor memory device, comprising:

a first wiring extending in a first direction;

a second wiring extending in the first direction and spaced from the first wiring in a second direction intersecting with the first direction;

a columnar insulating portion positioned between the first wiring and the second wiring and extending in a third direction intersecting the first direction and the second direction;

a first channel portion positioned between the first wiring and the columnar insulating portion and extending in the third direction;

a first charge storage structure positioned between the first wiring and the first channel portion;

a second channel portion positioned between the second wiring and the columnar insulating portion and extending in the third direction;

a second charge storage structure positioned between the second wiring and the second channel portion; and a first insulating layer provided between the first wiring and the second wiring along with the columnar insulating portion in the first direction, and having at least a portion being provided between the first charge storage structure and the second charge storage structure, wherein the first insulating layer includes: a first end which is an end in the second direction including a first edge positioned at an end of the first insulating layer in the second direction and extending in the first direction; and a first insulating portion of the first insulating layer positioned away from the first edge in the second direction, and the first end includes an inclined portion inclined so as to approach the first insulating portion as approaching the columnar insulating portion in the first direction.

12. The semiconductor memory device according to claim 11, comprising a columnar body including the columnar insulating portion, a channel layer including the first channel portion and the second channel portion, and a second insulating film surrounding the channel layer, wherein the columnar body includes a portion parallel to the inclined portion in the first direction, and a total dimension, including a dimension of the inclined portion in the first direction and half of the dimension of the portion of the inclined portion in the first direction, is equal to or greater than half of a maximum dimension of the columnar body in the first direction.

* * * * *